United States Patent
Tamatam et al.

(10) Patent No.: US 11,169,683 B2
(45) Date of Patent: Nov. 9, 2021

(54) SYSTEM AND METHOD FOR EFFICIENT SCROLLING

(71) Applicant: QUALCOMM Incorporated, San Diego, CA (US)

(72) Inventors: Raviteja Tamatam, Hyderabad (IN); Jayant Shekhar, Hyderabad (IN); Kalyan Thota, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 16/037,477

(22) Filed: Jul. 17, 2018

(65) Prior Publication Data

US 2020/0026403 A1 Jan. 23, 2020

(51) Int. Cl.
| | |
|---|---|
| *G06F 17/00* | (2019.01) |
| *G06F 3/0485* | (2013.01) |
| *G09G 5/34* | (2006.01) |
| *G06T 1/60* | (2006.01) |
| *G06F 3/0488* | (2013.01) |
| *G06F 3/16* | (2006.01) |
| *G06F 3/01* | (2006.01) |
| *G06T 1/20* | (2006.01) |

(52) U.S. Cl.
CPC ............ *G06F 3/0485* (2013.01); *G06F 3/013* (2013.01); *G06F 3/04883* (2013.01); *G06F 3/167* (2013.01); *G06T 1/20* (2013.01); *G06T 1/60* (2013.01); *G09G 5/34* (2013.01); *G06T 2200/28* (2013.01)

(58) Field of Classification Search
None
See application file for complete search history.

(56) References Cited

U.S. PATENT DOCUMENTS

| | | | | |
|---|---|---|---|---|
| 9,785,332 | B1 * | 10/2017 | Karppanen | G06F 3/0485 |
| 10,715,577 | B2 * | 7/2020 | Hu | G06F 9/45533 |
| 2004/0180701 | A1 * | 9/2004 | Livet | H04W 52/0261 |
| | | | | 455/574 |
| 2008/0106597 | A1 * | 5/2008 | Amini | H04N 7/181 |
| | | | | 348/143 |
| 2008/0259221 | A1 * | 10/2008 | Longchambon | H04M 1/72527 |
| | | | | 348/739 |
| 2010/0095340 | A1 * | 4/2010 | Ei | H04N 7/17318 |
| | | | | 725/116 |
| 2010/0214249 | A1 * | 8/2010 | Ikeda | G06F 3/04883 |
| | | | | 345/173 |
| 2010/0303146 | A1 * | 12/2010 | Kamay | H04N 21/2343 |
| | | | | 375/240.02 |

(Continued)

OTHER PUBLICATIONS

OnePlus—Screen Brightness Changes Slightly When Scrolling, Oct. 16, 2014, Retrieved from the Internet, URL: https://forums.oneplus.com/threads/screen-brightness-changes-slightly-when-scrolling.148610/, 7 pages.

*Primary Examiner* — Mustafa A Amin
(74) *Attorney, Agent, or Firm* — Campbell Chiang

(57) ABSTRACT

In general, techniques are discussed for performing efficient content scrolling on smartphones and other user devices. Power and memory bandwidth requirements are reduced during high-speed scrolling by utilizing lossy compression of content during rendering with minimal user experience impact, as the user is less likely to notice artifacts resulting from high compression while the content is scrolling quickly.

26 Claims, 16 Drawing Sheets

(56) References Cited

U.S. PATENT DOCUMENTS

| | | | |
|---|---|---|---|
| 2011/0202847 A1* | 8/2011 | Dimitrov | G06F 3/0481 |
| | | | 715/738 |
| 2011/0304634 A1* | 12/2011 | Urbach | G06F 9/5016 |
| | | | 345/501 |
| 2012/0044251 A1* | 2/2012 | Mark | G06T 13/00 |
| | | | 345/474 |
| 2012/0062604 A1* | 3/2012 | Lobo | G06F 3/0485 |
| | | | 345/684 |
| 2012/0170667 A1* | 7/2012 | Girardeau, Jr. | H04N 19/423 |
| | | | 375/240.25 |
| 2013/0063489 A1* | 3/2013 | Hourie | G06T 17/05 |
| | | | 345/643 |
| 2013/0243075 A1* | 9/2013 | Dalela | H04L 65/80 |
| | | | 375/240.01 |
| 2014/0189487 A1 | 7/2014 | Kwan et al. | |
| 2014/0201673 A1* | 7/2014 | Dunn | G06F 3/0481 |
| | | | 715/781 |
| 2015/0123993 A1* | 5/2015 | Ohba | G09G 5/00 |
| | | | 345/629 |
| 2015/0205474 A1* | 7/2015 | Donelan | G06F 3/0485 |
| | | | 715/784 |
| 2015/0370439 A1* | 12/2015 | Val | G06F 3/0485 |
| | | | 715/830 |
| 2016/0217763 A1* | 7/2016 | Toyoda | G09G 5/006 |
| 2017/0041086 A1* | 2/2017 | Park | H04B 15/02 |

\* cited by examiner

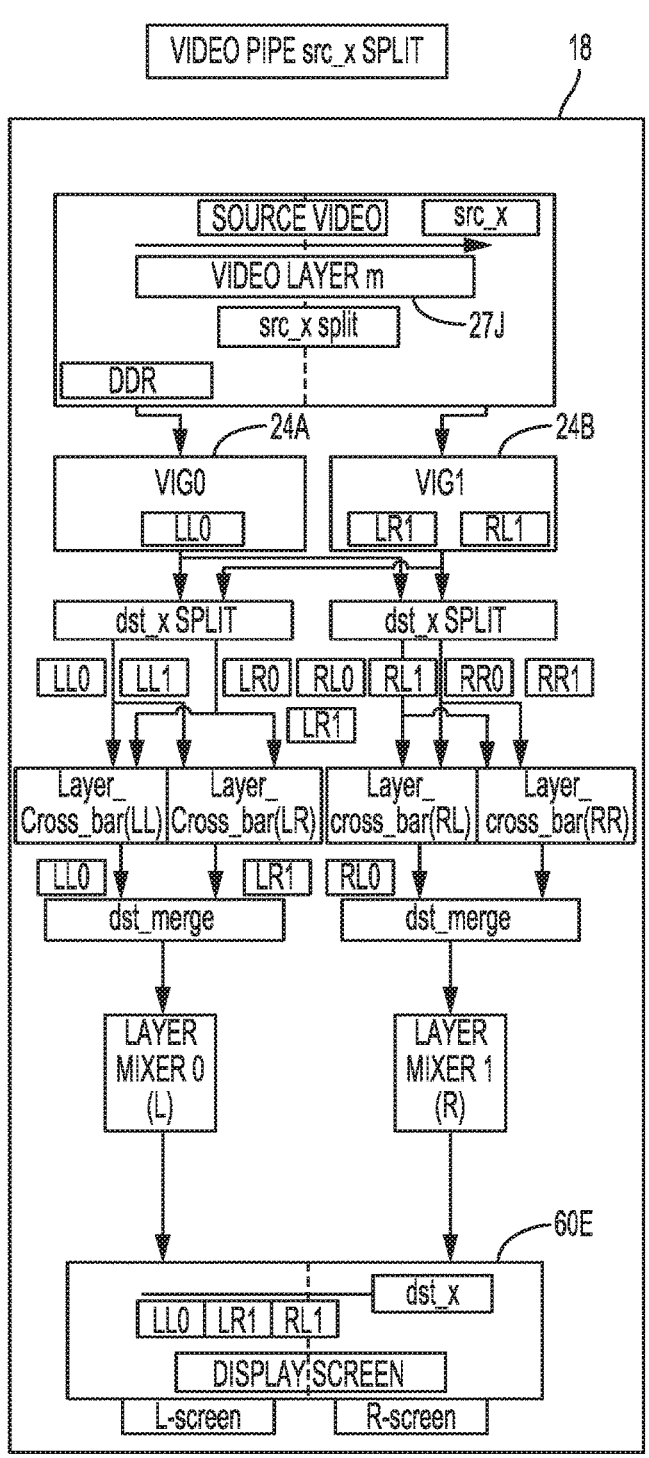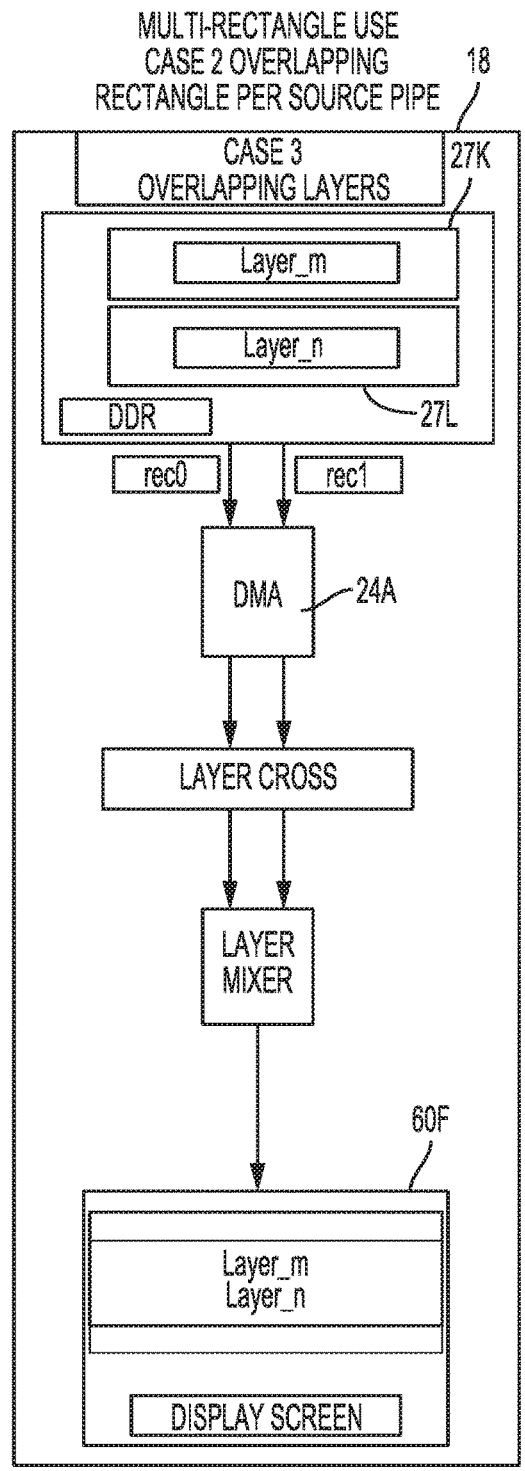
FIG. 4E
FIG. 4F

SYSTEM AND METHOD FOR EFFICIENT SCROLLING

TECHNICAL FIELD

This disclosure relates to displaying content on a display.

BACKGROUND

Displaying visual content such as text, graphics, images, and video to a user includes various phases, including a rendering phase. The rendering phase draws a content to be displayed onto a display device, for example, a display panel. The rendering phase may be computationally taxing, especially for high-resolution and complex content. The content may be scrolled at various speeds responsive to user input. Maintaining a high user experience during fast scrolling may be difficult if there is little time to render a large amount of complex content.

SUMMARY

In one example embodiment, a method of displaying scrolling content is discussed. The method may include, responsive to instructions from an executing application, rendering a layer by a GPU into a memory. The method may include determining a requested scrolling speed based on a user input. The method may include, responsive to determining the requested scrolling speed is at or below a first threshold, retrieving the layer from memory with lossless fetch compression. The method may include, responsive to determining the requested scrolling speed is above the first threshold, retrieving the layer from memory with lossy fetch compression. The method may include communicating the retrieved layer to a display panel. The user input may be based on at least one of: a magnitude of a touch panel user finger swipe, a direction of the touch panel user finger swipe, a user voice command, a user eye gaze command, and a user-initiated autoscroll command. The method may include determining a desired frame rate based on the user input, wherein the retrieved layer is communicated to the display panel at the desired frame rate. The method may include, responsive to determining the requested scrolling speed is at or above a second threshold, wherein the second threshold is higher than the first threshold, increasing a compression factor of the lossy fetch compression. The lossy fetch compression may be executed by the GPU on the layer in the memory. The compression factor may be increased based on at least one of: an available memory bandwidth and a power consumption limit. The retrieved layer may be communicated to the display panel over a display compositor pipeline and a DSI interface. The DSI interface may be in communication with at least one of: a command mode display panel and a video mode display panel.

In another example embodiment, an apparatus for displaying scrolling content is discussed. The apparatus may include a memory. The apparatus may include a processor. The processor may be configured to, responsive to instructions from an executing application, render a layer by a GPU into the memory. The processor may be configured to determine a requested scrolling speed based on a user input. The processor may be configured to, responsive to determining the requested scrolling speed is at or below a first threshold, retrieve the layer from memory with lossless fetch compression. The processor may be configured to, responsive to determining the requested scrolling speed is above the first threshold, retrieve the layer from memory with lossy fetch compression. The processor may be configured to communicate the retrieved layer to a display panel. The user input may be based on at least one of: a magnitude of a touch panel user finger swipe, a direction of the touch panel user finger swipe, a user voice command, a user eye gaze command, and a user-initiated autoscroll command. The processor may be configured to determine a desired frame rate based on the user input, wherein the retrieved layer is communicated to the display panel at the desired frame rate. The processor may be configured to, responsive to determining the requested scrolling speed is at or above a second threshold, wherein the second threshold is higher than the first threshold, increase a compression factor of the lossy fetch compression. The lossy fetch compression may be executed by the GPU on the layer in the memory. The compression factor may be increased based on at least one of: an available memory bandwidth and a power consumption limit. The retrieved layer may be communicated to the display panel over a display compositor pipeline and a DSI interface. The DSI interface may be in communication with at least one of: a command mode display panel and a video mode display panel.

In another example embodiment, an apparatus for displaying scrolling content is discussed. The apparatus may include means for storage. The apparatus may include means for processing. The means for processing may be configured to, responsive to instructions from an executing application, render a layer by a GPU into the storage means. The means for processing may be configured to determine a requested scrolling speed based on a user input. The means for processing may be configured to, responsive to determining the requested scrolling speed is at or below a first threshold, retrieve the layer from memory with lossless fetch compression. The means for processing may be configured to, responsive to determining the requested scrolling speed is above the first threshold, retrieve the layer from memory with lossy fetch compression. The means for processing may be configured to communicating the retrieved layer to a display panel. The user input may be based on at least one of: a magnitude of a touch panel user finger swipe, a direction of the touch panel user finger swipe, a user voice command, a user eye gaze command, and a user-initiated autoscroll command. The means for processing may be configured to determine a desired frame rate based on the user input, wherein the retrieved layer is communicated to the display panel at the desired frame rate. The means for processing may be configured to responsive to determining the requested scrolling speed is at or above a second threshold, wherein the second threshold is higher than the first threshold, increase a compression factor of the lossy fetch compression. The lossy fetch compression may be executed by the GPU on the layer in the storage means. The compression factor may be increased based on at least one of: an available memory bandwidth and a power consumption limit. The retrieved layer may be communicated to the display panel over a display compositor pipeline and a DSI interface. The DSI interface may be in communication with at least one of: a command mode display panel and a video mode display panel.

In another example embodiment, a non-transitory computer-readable storage medium having stored thereon instructions that, when executed, cause a processor to execute a method will be discussed. The method may include, responsive to instructions from an executing application, rendering a layer by a GPU into a memory. The method may include determining a requested scrolling speed based on a user input. The method may include, responsive to determining the requested scrolling speed is at or below a first threshold, retrieving the layer from memory with lossless fetch compression. The method may include, responsive to determining the requested scrolling speed is above the first threshold, retrieving the layer from memory with lossy fetch compression. The method may include communicating the retrieved layer to a display panel. The user input may be based on at least one of: a magnitude of a touch panel user finger swipe, a direction of the touch panel user finger swipe, a user voice command, a user eye gaze command, and a user-initiated autoscroll command. The method may include determining a desired frame rate based on the user input, wherein the retrieved layer is communicated to the display panel at the desired frame rate. The method may include, responsive to determining the requested scrolling speed is at or above a second threshold, wherein the second threshold is higher than the first threshold, increasing a compression factor of the lossy fetch compression. The lossy fetch compression may be executed by the GPU on the layer in the memory. The compression factor may be increased based on at least one of: an available memory bandwidth and a power consumption limit. The retrieved layer may be communicated to the display panel over a display compositor pipeline and a DSI interface. The DSI interface may be in communication with at least one of: a command mode display panel and a video mode display panel.

The details of one or more examples are set forth in the accompanying drawings and the description below. Other features, objects, and advantages will be apparent from the description, drawings, and claims.

BRIEF DESCRIPTION OF DRAWINGS

FIGS. 4A-4H are diagrams illustrating different example operations performed by a display processor in accordance with various aspects of the techniques described in this disclosure.

DETAILED DESCRIPTION

Smartphones and other user devices may display content to a user, and the user may scroll a viewable content responsive to user input. Scrolling may be relatively slow or relatively fast. Relatively fast scrolling can be computationally- and bandwidth-intensive, especially for complex content. Power and memory bandwidth requirements may be reduced by utilizing lossy compression of content from during the rendering phase during relatively fast scrolling with minimal user experience impact, as the user is less likely to notice artifacts resulting from high compression while the content is scrolling quickly.

Figure 1:
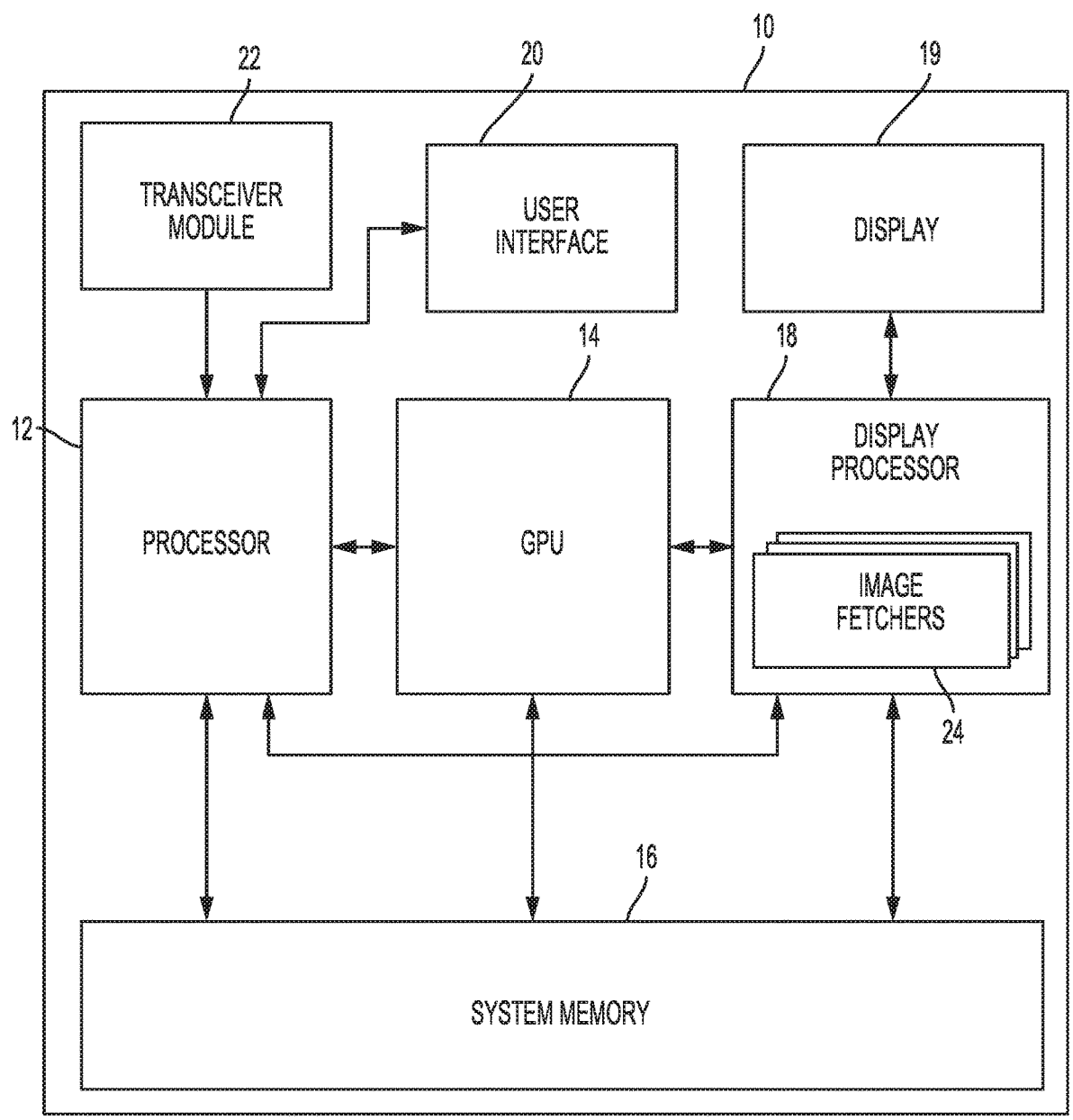
FIG. 1 is a block diagram illustrating an example device for image composition and display in accordance with one or more example techniques described in this disclosure.

FIG. 1 is a block diagram illustrating an example device for image display in accordance with one or more example techniques described in this disclosure. FIG. 1 illustrates device 10, examples of which include, but are not limited to, video devices such as media players, set-top boxes, wireless handsets such as mobile telephones (e.g., so-called smartphones), personal digital assistants (PDAs), desktop computers, laptop computers, gaming consoles, video conferencing units, tablet computing devices, and the like.

In the example of FIG. 1, device 10 includes processor 12, graphics processing unit (GPU) 14, system memory 16, display processor 18, display 19, user interface 20, and transceiver module 22. In examples where device 10 is a mobile device, display processor 18 is a mobile display processor (MDP). In some examples, such as examples where device 10 is a mobile device, processor 12, GPU 14, and display processor 18 may be formed as an integrated circuit (IC). For example, the IC may be considered as a processing chip within a chip package, and may be a system-on-chip (SoC). In some examples, two of processors 12, GPU 14, and display processor 18 may be housed together in the same IC and the other in a different integrated circuit (i.e., different chip packages) or all three may be housed in different ICs or on the same IC. However, it may be possible that processor 12, GPU 14, and display processor 18 are all housed in different integrated circuits in examples where device 10 is a mobile device.

Examples of processor 12, GPU 14, and display processor 18 include, but are not limited to, one or more digital signal processors (DSPs), general purpose microprocessors, application specific integrated circuits (ASICs), field programmable logic arrays (FPGAs), or other equivalent integrated or discrete logic circuitry. Processor 12 may be the central processing unit (CPU) of device 10. In some examples, GPU 14 may be specialized hardware that includes integrated and/or discrete logic circuitry that provides GPU 14 with massive parallel processing capabilities suitable for graphics processing. In some instances, GPU 14 may also include general purpose processing capabilities, and may be referred to as a general purpose GPU (GPGPU) when implementing general purpose processing tasks (i.e., non-graphics related tasks). Display processor 18 may also be specialized integrated circuit hardware that is designed to retrieve image content from system memory 16, compose the image content into an image frame, and output the image frame to display 19.

Processor 12 may execute various types of applications. Examples of the applications include web browsers, e-mail applications, spreadsheets, video games, or other applications that generate viewable objects for display. System memory 16 may store instructions for execution of the one or more applications. The execution of an application on processor 12 causes processor 12 to produce graphics data for image content that is to be displayed. Processor 12 may transmit graphics data of the image content to GPU 14 for further processing based on and instructions or commands that processor 12 transmits to GPU 14.

Processor 12 may communicate with GPU 14 in accordance with a particular application processing interface (API). Examples of such APIs include the DirectX® API by Microsoft®, the OpenGL® or OpenGL ES® by the Khronos group, and the OpenCL™; however, aspects of this disclosure are not limited to the DirectX, the OpenGL, or the OpenCL APIs, and may be extended to other types of APIs. Moreover, the techniques described in this disclosure are not required to function in accordance with an API, and processor 12 and GPU 14 may utilize any technique for communication or transmission.

System memory 16 may be the memory for device 10. System memory 16 may comprise one or more computer-readable storage media. Examples of system memory 16 include, but are not limited to, a random access memory (RAM), an electrically erasable programmable read-only memory (EEPROM), flash memory, or other medium that can be used to carry or store desired program code in the form of instructions and/or data structures and that can be accessed by a computer or a processor.

In some aspects, system memory 16 may include instructions that cause processor 12, GPU 14, and/or display processor 18 to perform the functions ascribed in this disclosure to processor 12, GPU 14, and/or display processor 18. Accordingly, system memory 16 may be a computer-readable storage medium having instructions stored thereon that, when executed, cause one or more processors (e.g., processor 12, GPU 14, and/or display processor 18) to perform various functions.

System memory 16 is a non-transitory storage medium. The term "non-transitory" indicates that the storage medium is not embodied in a carrier wave or a propagated signal. However, the term "non-transitory" should not be interpreted to mean that system memory 16 is non-movable or that its contents are static. As one example, system memory 16 may be removed from device 10, and moved to another device. As another example, memory, substantially similar to system memory 16, may be inserted into device 10. In certain examples, a non-transitory storage medium may store data that can, over time, change (e.g., in RAM).

As noted above, display processor 18 may perform composition of layers to form a frame for display by a display unit (e.g., shown in the example of FIG. 1 as display 19, which may represent one or more of a liquid crystal display (LCD), a light emitting diode (LED) display, an organic LED display, and the like). In some examples, display processors similar to display processor 18 may include a number of different hardware pipelines (such as the above noted "image fetchers"), each of which may process a single layer. A layer, in this description, may refer to a single window or rectangle of image data. The display processors may arrange the layers in various ways to compose the frame, and load the frame into a display buffer of a display for display to the operator of the device.

Each of the different hardware pipelines of the display processor may fetch a single layer from memory and perform various operations, such as rotation, clipping, mirroring, blurring, or other editing operations with respect to the layer. Each of the different hardware pipelines may concurrently fetch a different layer, perform these various editing operations, outputting the processed layers to mixers that mix one or more of the different layers to form a frame.

As utilization of devices (such as mobile devices) to perform increasingly more tasks, including transmission of frames wirelessly for display via display units not integrated within the mobile device (such as television sets), devices have begun to provide multitasking in terms of presenting multiple windows alongside one another. These windows may also be accompanied by various alerts, notifications, and other on-screen items.

To accommodate the additional layers that result from the increased number of layers, the display processor may offer more hardware pipelines to allow for an increased number of layers to be processed. Adding additional hardware pipelines may however result in increased die area for the SoC, potentially increasing power utilization and adding significant cost.

In the techniques described in this disclosure, a single hardware image fetcher pipeline of hardware image fetcher pipelines 24 ("image fetchers 24") in display processor 18 may independently process two or more layers. Rather than process a single layer (or multiple dependent layers where any operation performed to one of the multiple dependent layers is also performed with respect to the other dependent layers), the techniques may allow a single one of image fetchers 24 of display processor 18 to individually process one of the multiple independent layers separate from the other ones of the multiple layers. Unlike dependent layers, for independent layers any operation performed to one of the independent layers need not necessarily be performed with respect to the other dependent layers. The example techniques are described with respect to independent layers, but may be applicable to dependent layers as well.

In operation, each individual one of image fetchers 24 of display processor 18 may concurrently (e.g., in parallel or at the same time) retrieve or, in other words, "fetch" two or more layers. Each of image fetchers 24 may next individually process the two or more layers. For example, one of image fetchers 24 may apply a first operation with respect a first one of the layers and apply a second, different operation with respect to the second one of the layers. Example operations include a vertical flip, a horizontal flip, clipping, rotation, etc.

After individually processing the multiple layers, each of the image fetchers 24 may individually output the multiple processed layers to layer mixing units that may mix the multiple processed layers to form a frame. In some examples, a single first processed layer of the multiple layers processed by a first one of image fetchers 24 may be mixed with a single second processed layer of the multiple layers processed by a second one of image fetchers 24 where the remaining layers of the multiple layers processed by the first and second ones of image fetchers 24 may be mixed separate from the single first and second layers. As such, each of the image fetchers 24 has multiple outputs to a crossbar connecting the hardware pipelines to the layer mixing units, as described below in more detail with respect to FIG. 2.

In this respect, the techniques may allow each of image fetchers 24 to independently process two or more layers, thereby increasing the number of layers display processor 18 is able to concurrently retrieve, and potentially without increasing the number of image fetchers 24. As such, the techniques may improve layer throughput without, in some examples, adding additional image fetchers to image fetchers 24, which may avoid an increase in boardspace, or chip area (which may also be referred to as "chip die area") for a system on a chip design, cost, etc.

Figure 2:
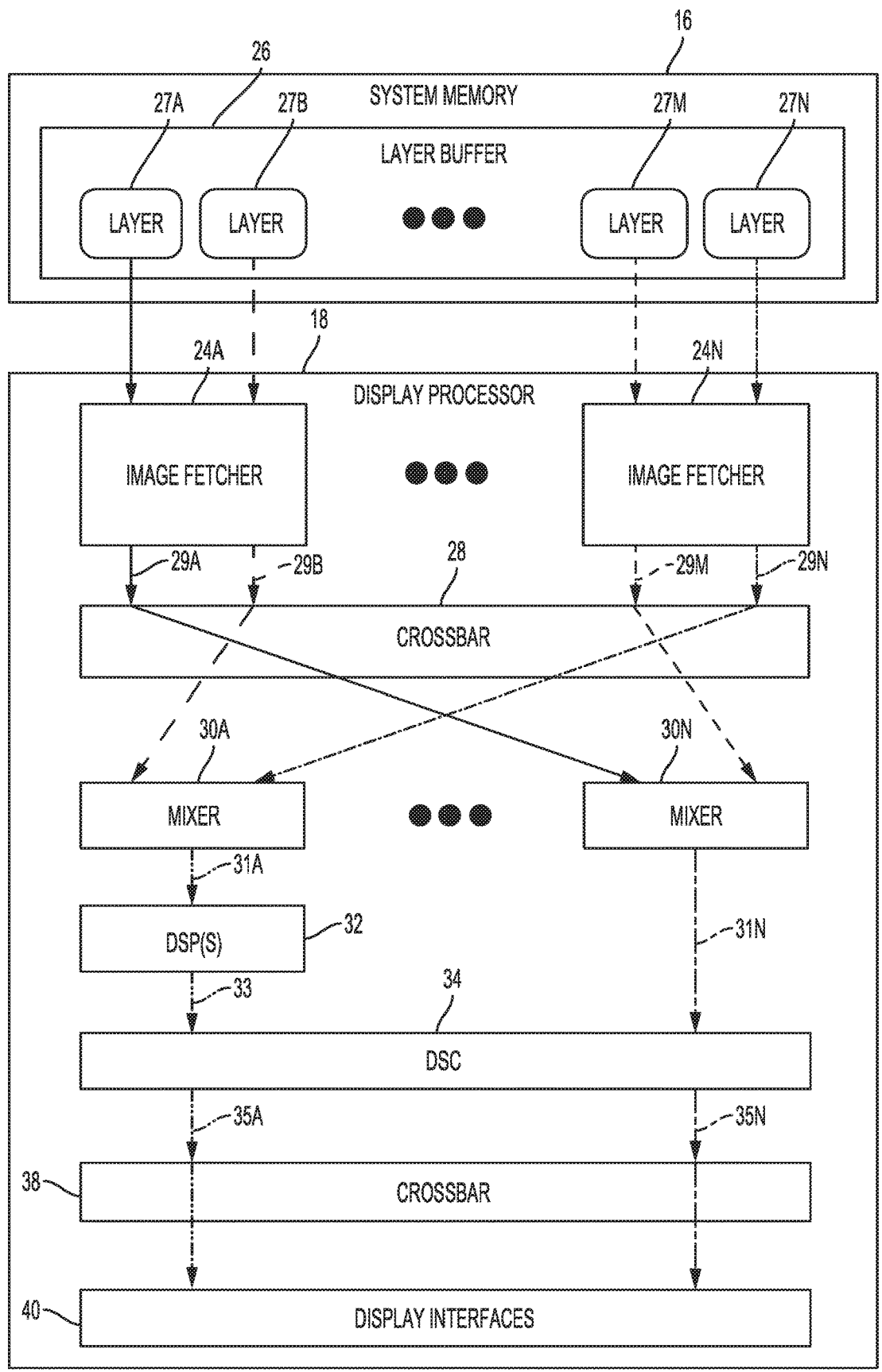
FIG. 2 is a block diagram illustrating components of the device illustrated in FIG. 1 in greater detail.

FIG. 2 is a block diagram illustrating components of device 10 illustrated in FIG. 1 in greater detail. In the example of FIG. 2, system memory 16 and display processor 18 of device 10 are shown in greater detail. System memory 16 includes a layer buffer 26 configured to store independent layers 27A-27N ("layers 27"). Each of layers 27 may represent a separate, independent image, or a portion of a separate, independent image.

As further shown in the example of FIG. 2, display processor 18 includes image fetchers 24, crossbar 28, mixers 30A-30N ("mixers 30"), one or more digital signal processors (DSP(s)) 32, display stream compression (DSC) unit 34 ("DSC 34"), crossbar 38, and display interfaces 40. Each of image fetchers 24 represent a single hardware image fetcher pipeline configured to perform the techniques described in this disclosure to concurrently fetch two or more of layers 27 from layer buffer 26 and concurrently process each of the fetches two or more of layers 27.

Each of image fetchers 24 may execute according to a clock cycle to fetch a pixel from each of the two or more of layers 27. In this respect, the discussion of fetching layers 27 should be understood to refer to fetching of a pixel from each of layers 27. Each of image fetchers 24 may therefore fetch two or more of layers 27 by fetching a pixel from each of the two or more layers 27. Image fetchers 24 may be configured to perform a direct memory access (DMA), which refers to a process whereby images fetchers 24 may directly access system memory 16 independently from processor 12, or in other words, without requesting that processor 12 manage the memory access.

As shown in the example of FIG. 2, image fetcher 24A fetches layers 27A and 27B, while image fetcher 24N may fetch layers 27M and 27N. Although shown as fetching specific layers (e.g., layers 27A, 27B, 27M, and 27N), image fetchers 24 may each fetch any one of layers 27.

Image fetchers 24 may fetch two or more individual, distinct (or, in other words, independent) ones of layers 27 rather than fetch a single individual, distinct layer or a layer having two or more dependent sub-layers (as in the case of video data in which a luminance sub-layer and a chrominance sub-layer are dependent in that any operation performed with respect to one of the sub-layers is also performed with respect to the other sub-layer). Image fetchers 24 may each be configured to perform a different operation with respect to each of the two or more fetched ones of layers 27. The various operations are described in more detail with respect to FIGS. 3A-3E and 4A-4H. Image fetchers 24 may each output the two or more processed ones of layers 27 (shown as processed layers 29 in the example of FIG. 2) to crossbar 28.

In this sense, each of image fetchers 24 may support multi-layer (or, for rectangular images, multi-rectangle) fetching when configured in DMA mode. Each of the fetched layers 27 may have a different color or tile format (given that each layer is independent and not dependent from one another), and a different horizontal/vertical flip setting (again, because each of the two of more fetched ones of layer 27 is independent form one another). Each of image fetchers 24 may also support, as described in more detail below, overlapping of the two or more fetched ones of layers 27, as well as, support source splitting.

Crossbar 28 may represent a hardware unit configured to route or otherwise switch anyone of processed layers 29 to any one of mixers 30. Crossbar 28 may include a number of stages, each stage having nodes equal to half of a number of inputs to crossbar 28. For example, assuming crossbar 28 includes 16 inputs, each stage of crossbar 28 may include eight nodes. The eight nodes of each stage may be interconnected to eight nodes of a successive stage in various combinations. One example combination may resemble what is referred to as a "non-blocking switch network" or "non-blocking network switch." Crossbar 28 may operate with respect to the clock cycle, transitioning processed layers from each stage to each successive stage per clock cycle, outputting processed layers 29 to one of mixers 30. Crossbar 28 is described in more detail below with respect to the example of FIG. 7.

Mixers 30 each represent a hardware unit configured to perform layer mixing to obtain composite layers 31A-31N ("composite layers 31"). Composite layers 31 may each include the two or more independent processed layers 29 combined in various ways as described in more detail below with respect to the examples of FIGS. 3A-3E and 4A-4H. Mixers 30 may also be configured to output composite layers 31 to either DSPs 32 or DSC 34.

DSPs 32 may represent a hardware unit configured to perform various digital signal processing operations. In some examples, DSPs 32 may represent a dedicated hardware unit that perform the various operations. In these and other examples, DSPs 32 may be configured to execute microcode or instructions that configure DSPs 32 to perform the operations. Example operations for which DSPs 32 may be configured to perform include picture adjustment, inverse gamma correction (IGC) using a lookup table (LUT), gamut mapping, polynomial color correction, panel correction using a LUT, and dithering. DSPs 32 may be configured to perform the operations to generate processed composite layers 33, outputting processed composite layers 33 to DSC 34.

DSC 34 may represent a unit configured to perform display stream compression. Display stream compression may refer to a process whereby processed composite layers 33 and composite layers 31N are losslessly or lossy compressed through application of predictive differential pulse-code modulation (DPCM) and/or color space conversion to the luminance (Y), chrominance green (Cg), and chrominance orange (Co) color space (which may also be referred to as YCgCo color model). DSC 34 may output compressed layers 35A-35N ("compressed layers 35," which may refer to compressed versions of both processed composite layers 33 and non-processed layers 31) to crossbar 38.

Crossbar 38 may be substantially similar to crossbar 28, routing or otherwise switching compressed layers 35 to various different display interfaces 40. Display interfaces 40 may represent one or more different interfaces by which to display compressed layers 35. DSC 34 may compress each of compressed layers 35 in different ways based on the type of display interface 40 to which compressed layers 35 are each is destined. Examples of different types of display interfaces 40 may include DisplayPort, video graphics array (VGA), digital visual interface (DVI), high definition multimedia interface (HDMI™), and the like. Display interfaces 40 may be configured to output each of the compressed layers 35 to one or more display, such as display 19, by writing the compressed layers 35 to a frame buffer or other memory structure, neither of which are shown for ease of illustration purposes.

FIG. 3A-3E are diagrams illustrating example operations for which each of display processor 18 may be configured to perform in accordance with various aspects of the techniques described in this disclosure. Below each of the operations are described, in part, as being performed by image fetcher 24A of display processor 18 for purposes of illustration, however each of image fetchers 24 may be configured to perform the operations described with respect to image fetcher 24A.

Figure 3A:
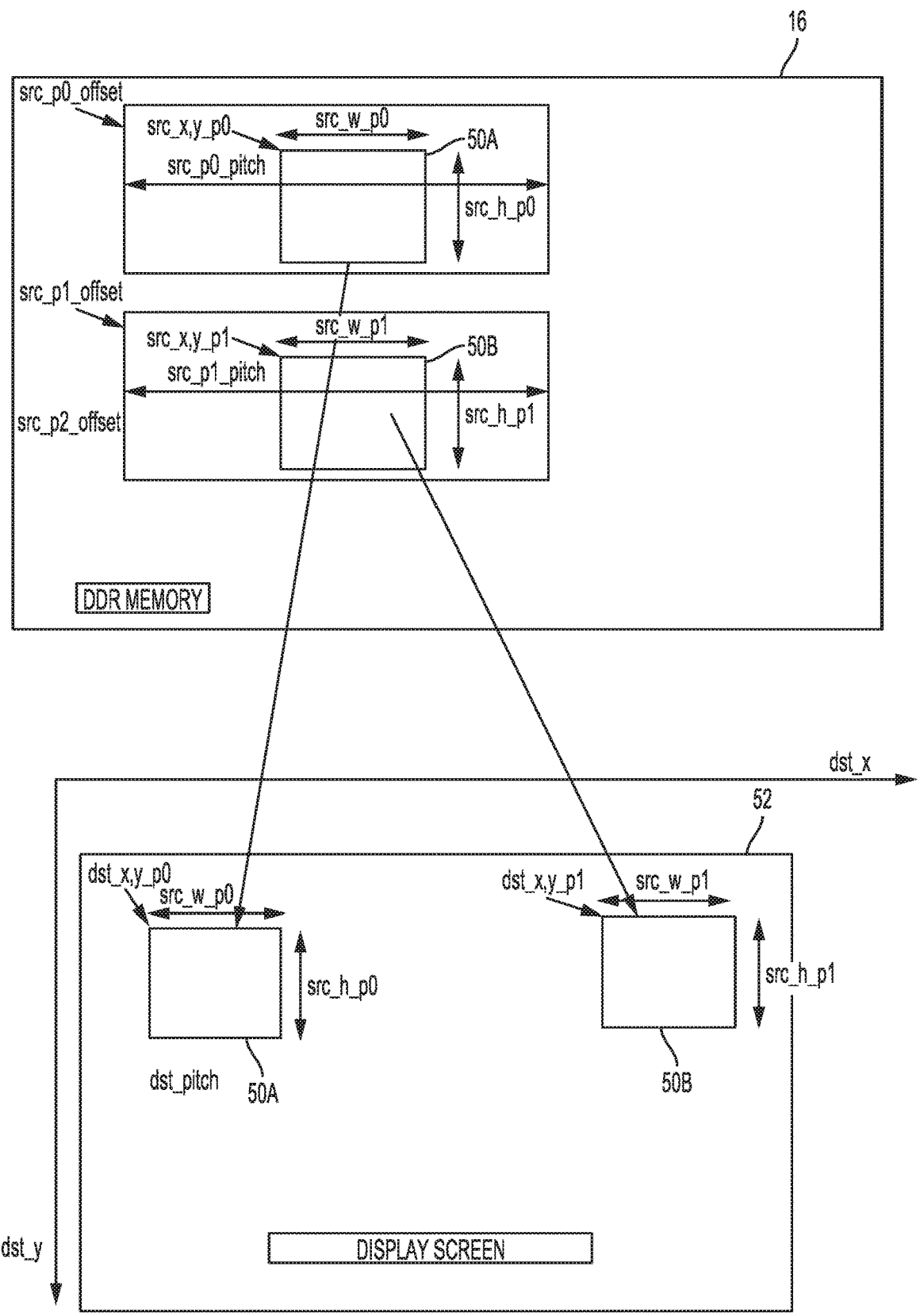
FIGS. 3A-3E illustrate different example display screens that the display processor of FIG. 2 may generate through concurrent fetches of different independent layers using a single image fetcher.

In the example of FIG. 3A, image fetcher 24A of display processor 18 may concurrently retrieve (or, in other words, fetch) both rectangle 50A and 50B (which may each be an example of a different one of independent layers 27 shown in the example of FIG. 2) from system memory 16 (where one example of system memory 16 may include double data rate—DDR—synchronous dynamic random access memory—DDR SDRAM—or "DDR memory"). The remaining portion of the hardware pipeline of display processor 18 shown in the example of FIG. 2 (referring to crossbar 28, mixers 30, DSPs 32, DSC 34, crossbar 38, and display interfaces 40) may generate display screen 52 (which may also be referred to as a "display frame" or "frame") to include rectangles 50A and 50B in the manner shown in FIG. 3A.

Figure 3B:
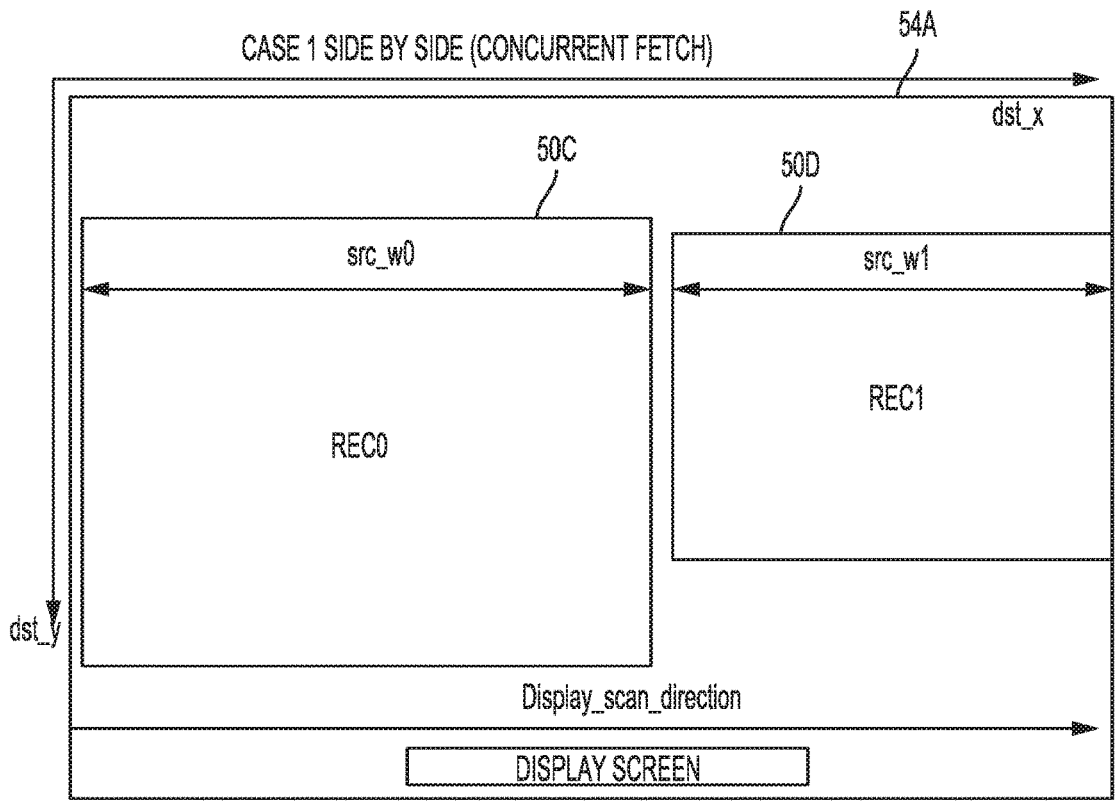

FIGS. 3B-3E illustrate different example display screens 54A-54D that display processor 18 may generate through concurrent fetches of different independent layers using a single image fetcher, e.g., image fetcher 24A. In the example of FIG. 3B, display processor 18 may invoke image fetcher 24A to concurrently fetch side-by-side rectangles 50C and 50D (which again may each be an example of a different one of independent layers 27 shown in the example of FIG. 2) from system memory 16. Display processor 18 may then generate display screen 54A that includes rectangles 50C and 50D.

Figure 3C:
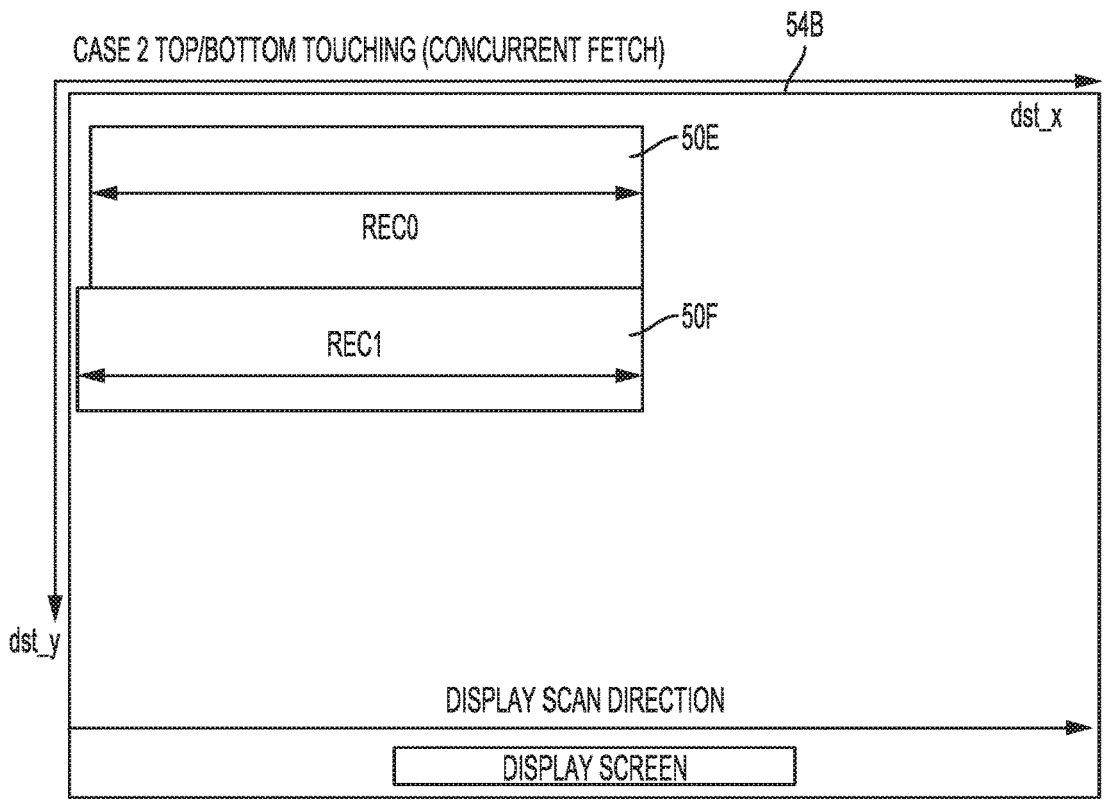

In the example of FIG. 3C, display processor 18 may invoke image fetcher 24A to concurrently fetch rectangles 50E and 50F (which again may each be an example of a different one of independent layers 27 shown in the example of FIG. 2) from system memory 16. Rectangles 50E and 50F may be adjacent to one another and touch (which may refer to having no intermediate pixel between) a bottom row of pixels of rectangle 50E and a top row of pixels of rectangle 50F. Display processor 18 may then generate display screen 54B that includes rectangles 50E and 50F.

Figure 3D:
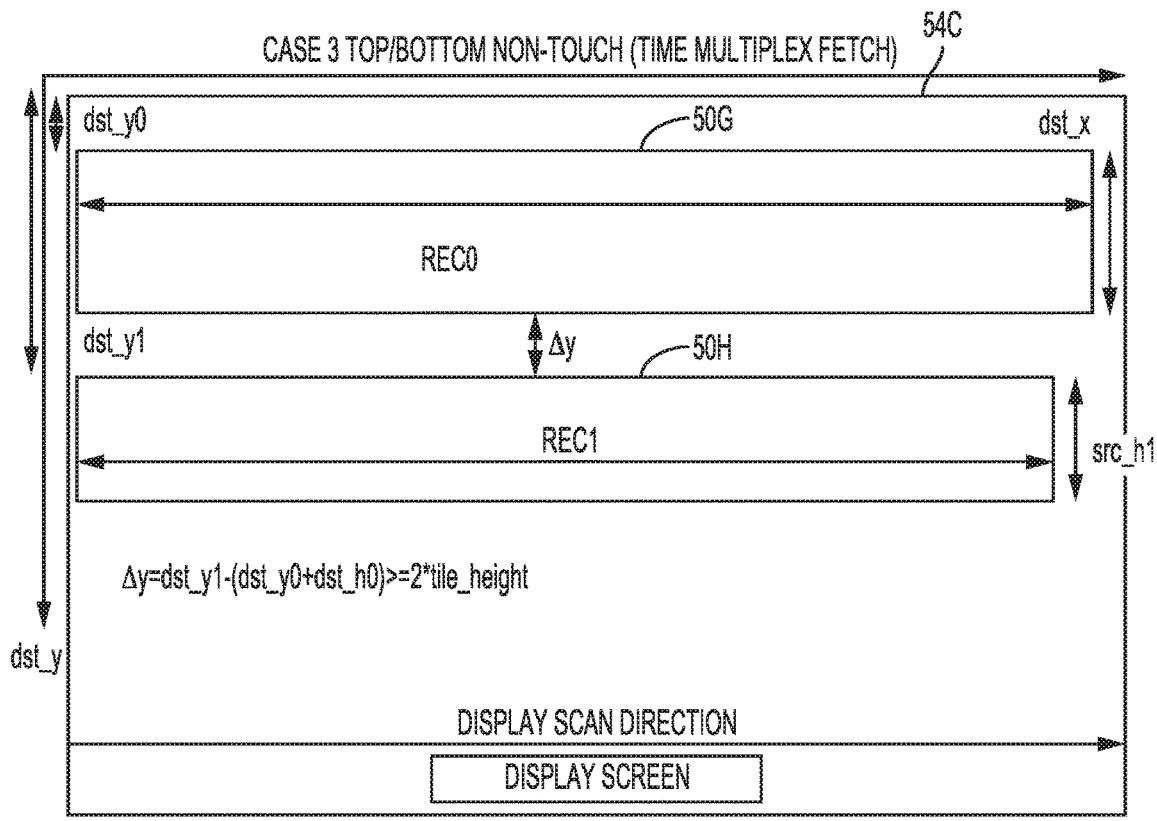

In the example of FIG. 3D, display processor 18 may invoke image fetcher 24A to time-multiplex fetch non-touching rectangles 50G and 50H (which again may each be an example of a different one of independent layers 27 shown in the example of FIG. 2) from system memory 16. Display processor 18 may perform a time-multiplex fetch to first fetch rectangle 50G and successively fetch rectangle 50H because rectangles 50G and 50H do not touch and as such do not need to be fetched concurrently in order to generate display screen 54C. In any event, display processor 18 may then generate display screen 54C that includes rectangles 50G and 50H.

Figure 3E:
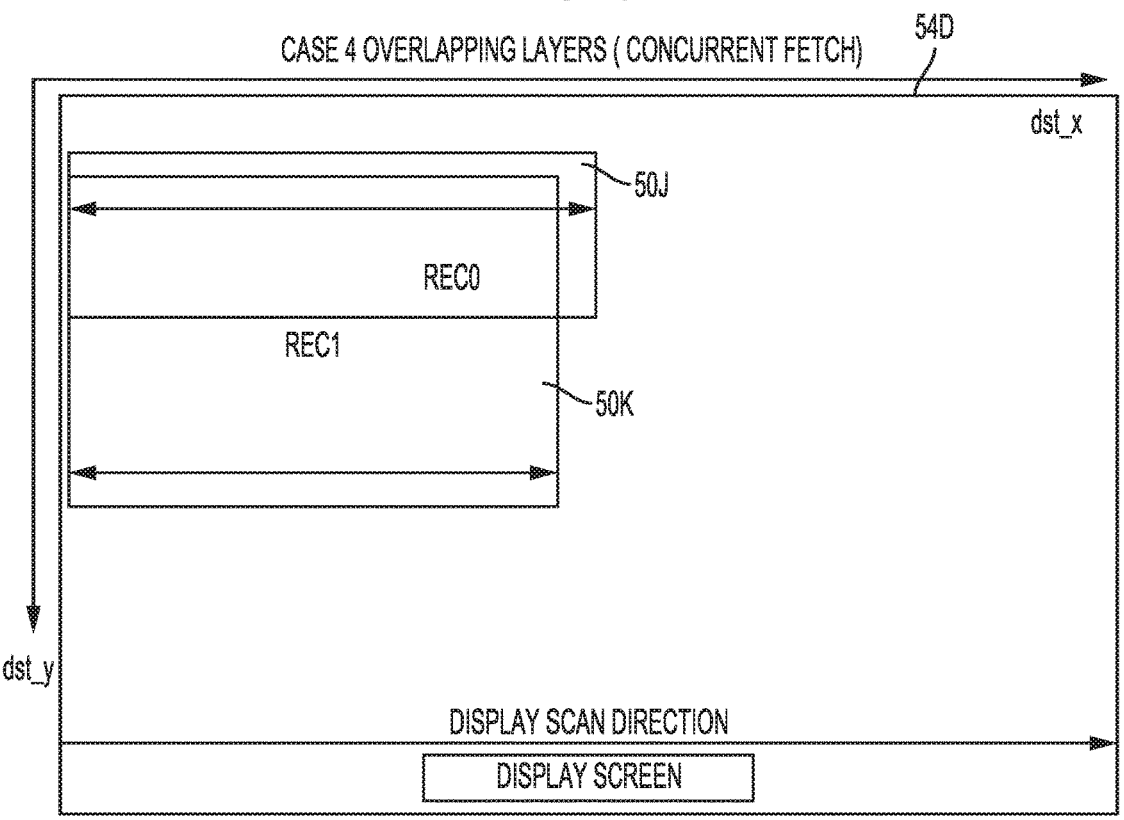

In the example of FIG. 3E, display processor 18 may invoke image fetcher 24A to concurrently fetch overlapping rectangles 50J and 50K (which again may each be an example of a different one of independent layers 27 shown in the example of FIG. 2) from system memory 16. Display processor 18 may then generate display screen 54D that includes rectangles 50J and 50K.

FIGS. 4A-4H are diagrams illustrating different example operations performed by display processor 18 in accordance with various aspects of the techniques described in this disclosure. Display processor 18 is shown in the examples of FIG. 4A-4H in simplified form, omitting various units of the hardware pipeline shown in FIG. 2 for ease of illustration purposes. Moreover, system memory 16 is shown as "DDR" and being incorporated within display processor 18. In some examples, display processor 18 may include or otherwise incorporate some portion of system memory 16 in the manner depicted in the examples of FIGS. 4A-4H. However, in these and other examples, display processor 18 may perform a DMA operation to directly access system memory 16, which may be separate from display processor 18.

Figures 4A, 4B:
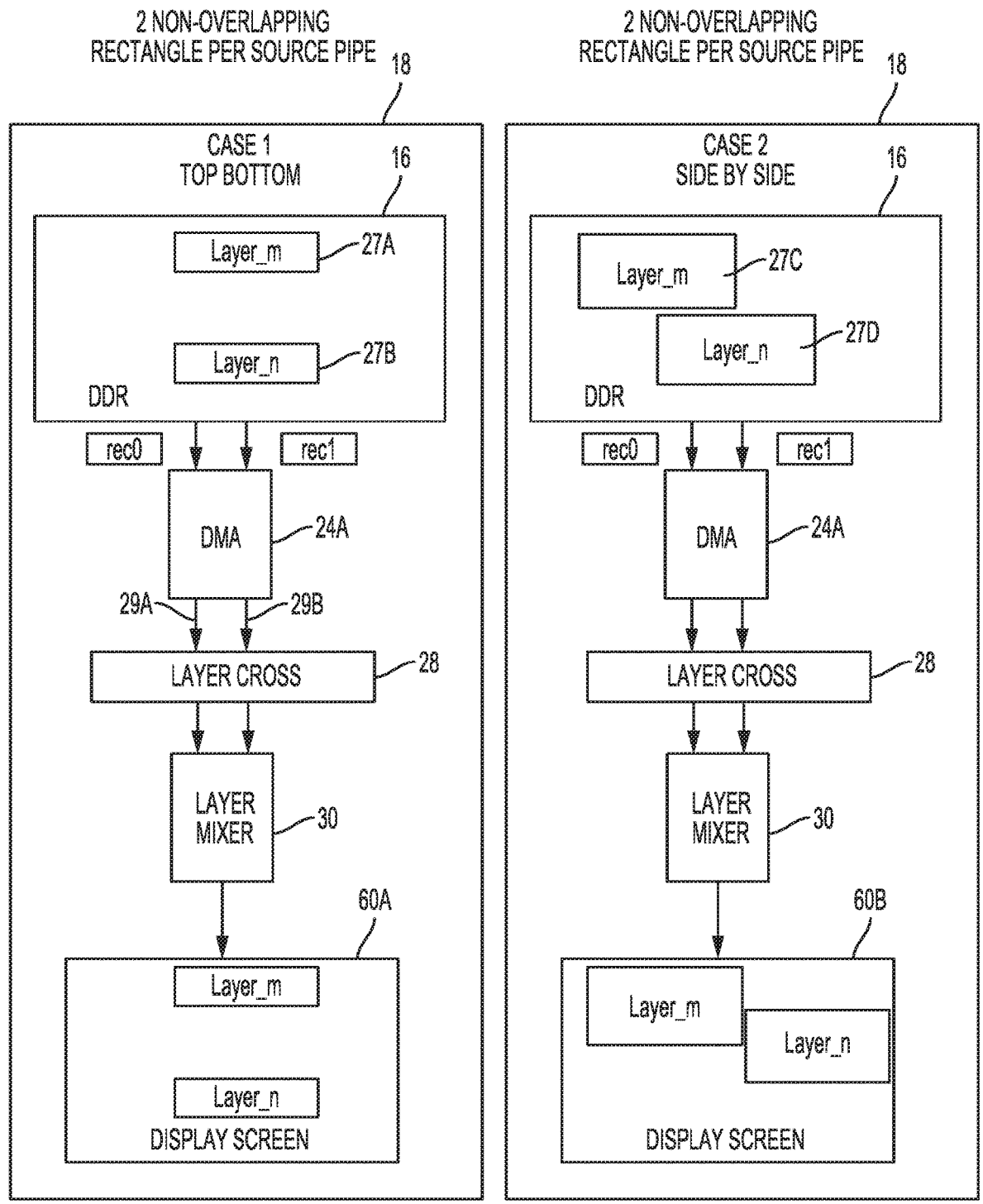

Referring first to the example of FIG. 4A, display processor 18 may concurrently fetch using a single image fetcher 24A (which is shown as "DMA 24A") both of layers 27A and 27B. Image fetcher 24 may process layers 27A and 27B, outputting processed layers 29A and 29B to crossbar 28 (shown as "layer cross 28"). Crossbar 28 may direct processed layers 29A and 29B to layer mixer 30, which may result in display screen 60 including processed layers 29A and 29B (or some derivation thereof, such as compressed layers 35A and 35B).

The example shown in FIG. 4B is similar to that of FIG. 4A, except that layers 27C and 27D are side-by-side in display screen 60B rather than oriented top and bottom as were layers 27A and 27B in display screen 60B of FIG. 4A. Display processor 18, as shown in the example of FIG. 4B, invokes image fetcher 24 to concurrently fetch side-by-side layers 27C and 27D.

Figures 4C, 4D:
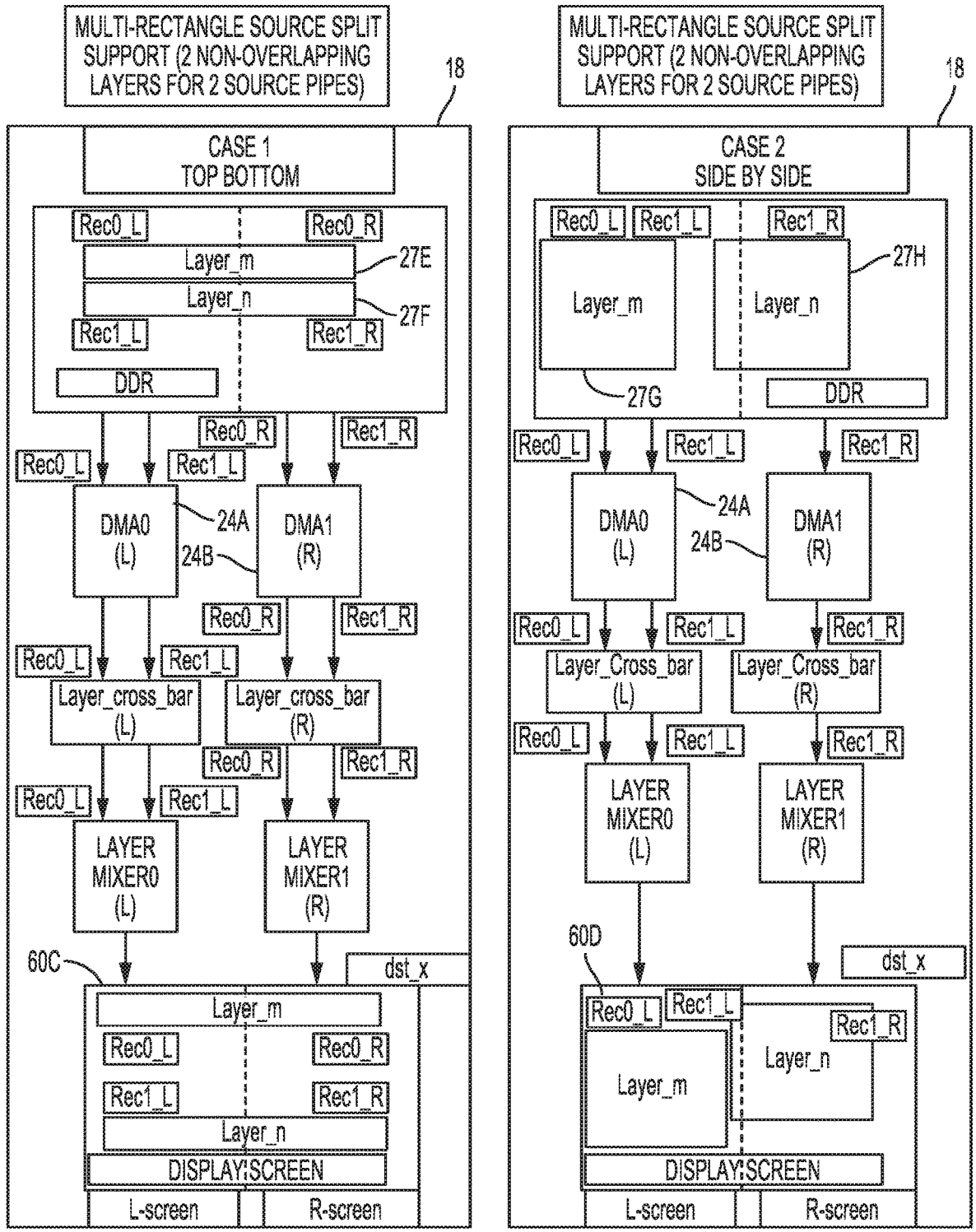

In the examples of FIGS. 4C and 4D, display processor 18 may concurrently fetch two layers 27E and 27F (shown in FIG. 4C) positioned top and bottom to one another, and two layers 27G and 27H (shown in FIG. 4D) positioned side-by-side when generating display screens 60C and 60D that are split across two displays. In both examples of FIGS. 4C and 4D, layers 27E and 27F and layers 27G and 27H do not overlap. Because layers 27E and 27F are split between two screens, display processor 18 may invoke two image fetchers 24 (e.g., image fetcher 24A and 24B) that each fetch a different portion of layers 27E and 27F. Image fetcher 24A may fetch a left portion of layer 27E and a left portion of layer 27F, while image fetcher 24B may fetch a right portion of layer 27E and a right portion of layer 27F. The right and left portions are defined by the split in display screen 60C, shown as a dashed line. Likewise, because layer 27H is split across two displays, display processor 18 may invoke image fetcher 24A to fetch layer 27G and a left portion of layer 27H, and image fetcher 24B to fetch a right portion of layer 27H.

Display processor 18 may, in the example of FIG. 4E, operate similar to that described above with respect to the other source screen split examples of FIGS. 4C and 4D, except that FIG. 4E illustrates the case in which a single layer 27J representative of video data is split across two displays. In the case of a video data layer such as layer 27J, display processor 18 invokes two of image fetchers 24 (e.g., image fetchers 24A and 24B) to separately fetch a left and right portion of layer 27J. Display processor 18 may then generate display screen 60E.

Figures 4G, 4H:
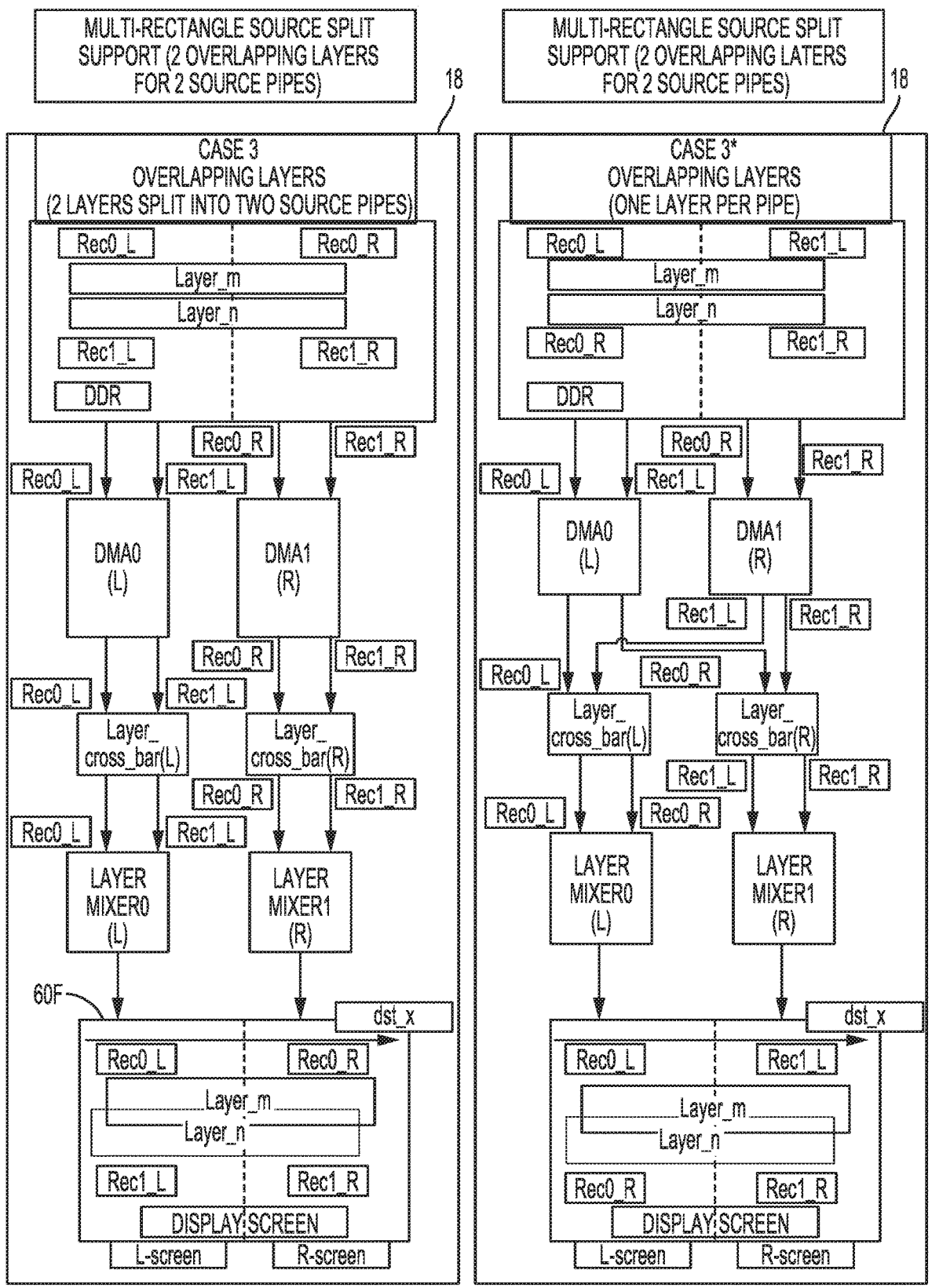

FIG. 4F is a diagram illustrating concurrent fetching of layers 27K and 27L by a single image fetcher 24A to generate a display screen 60F in which layers 27K and 27L overlap. In the example of FIG. 4G, display processor 18 may operate similar to that described above with respect to display processor 18 of FIG. 3C, except display processor 18 may generate display screen 60F having layers that overlap. In the example of FIG. 4H, display processor 18 may operate similar to that described above with respect to display processor 18 of FIG. 3G, except image fetchers 24A and 24B may process the right and left portions of the same layer and output the right portion and left portion respectively to the crossbar of the other image fetcher.

Figure 5A:
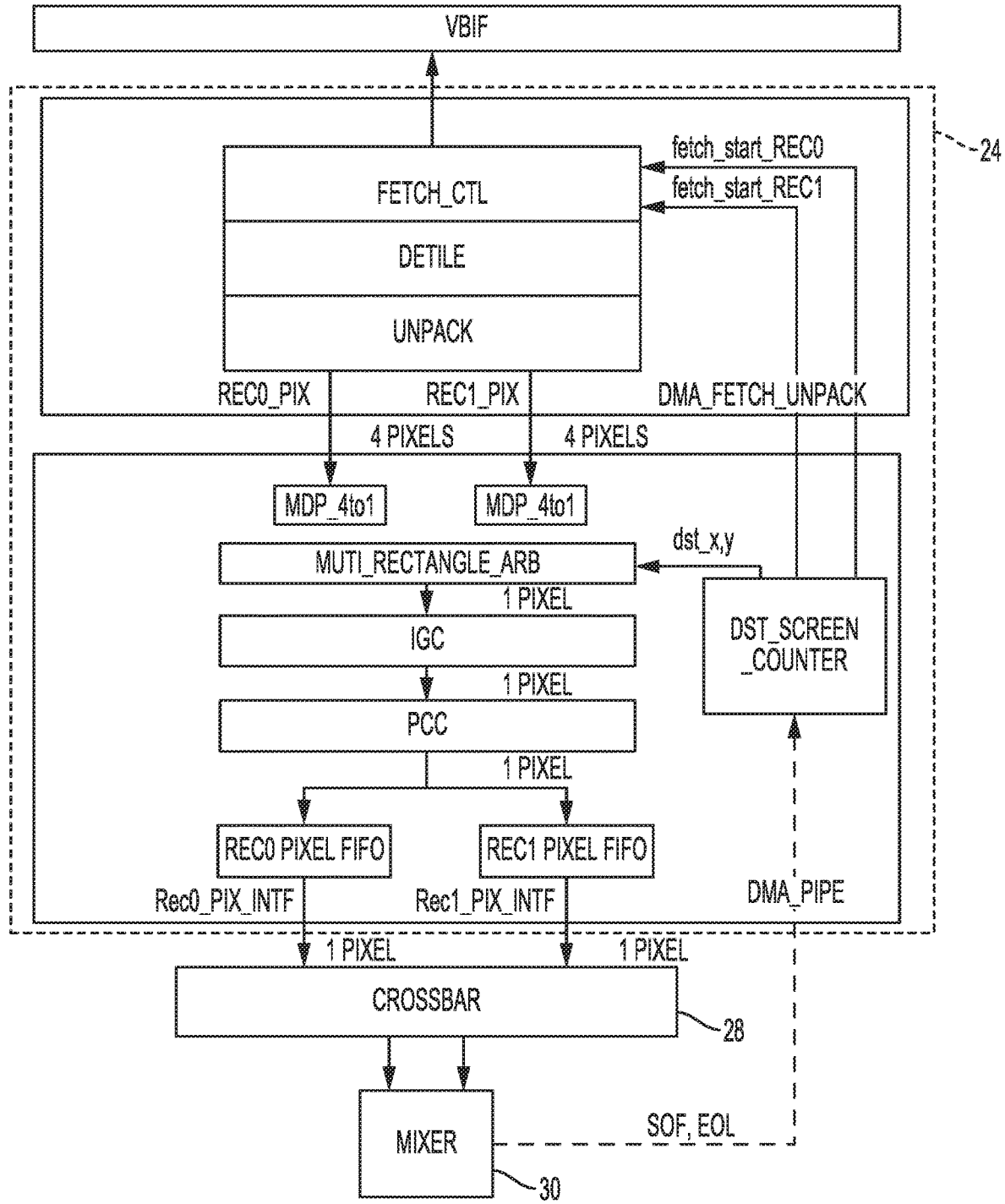
FIGS. 5A and 5B are diagrams illustrating different examples of one of the image fetchers shown in FIG. 2 in more detail.
Figure 5B:
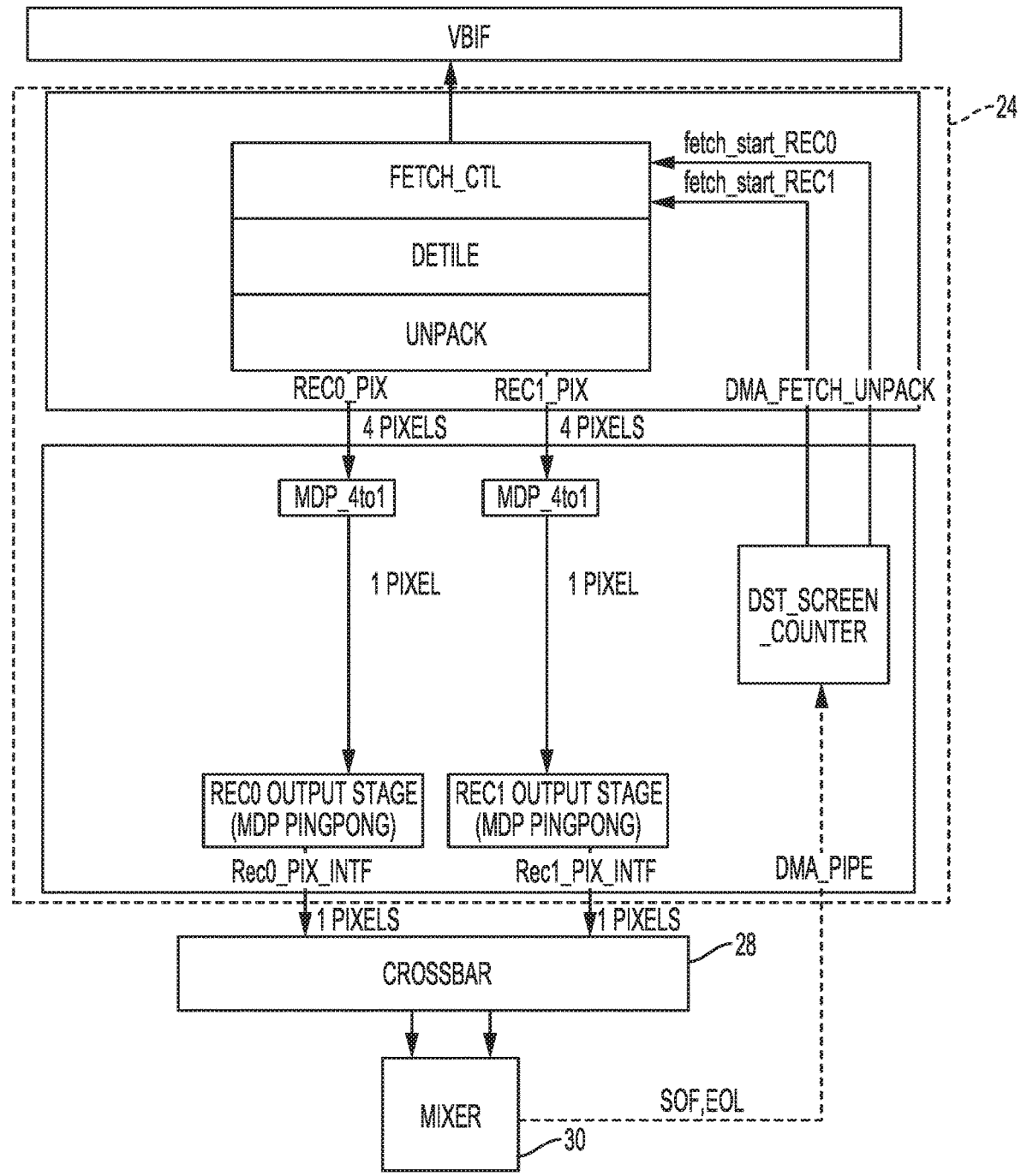

FIGS. 5A and 5B are diagrams illustrating different examples of one of image fetchers 24 in more detail. In the example of FIG. 5A, image fetcher 24 may retrieve and output two pixels from two independent layers, but some processing is still not entirely independent. In the example of FIG. 5B, image fetcher 24 may retrieve and output two pixels from two independent layers and process the two independent layers entirely independent from one another, allowing for improved support of overlapping layers. The pixel data from each layer, in the example of FIG. 5B, are directly output from source pipe with each layer has one pixel/clock throughput and total throughput of two pixels/ clock from the two layers.

Figure 6:
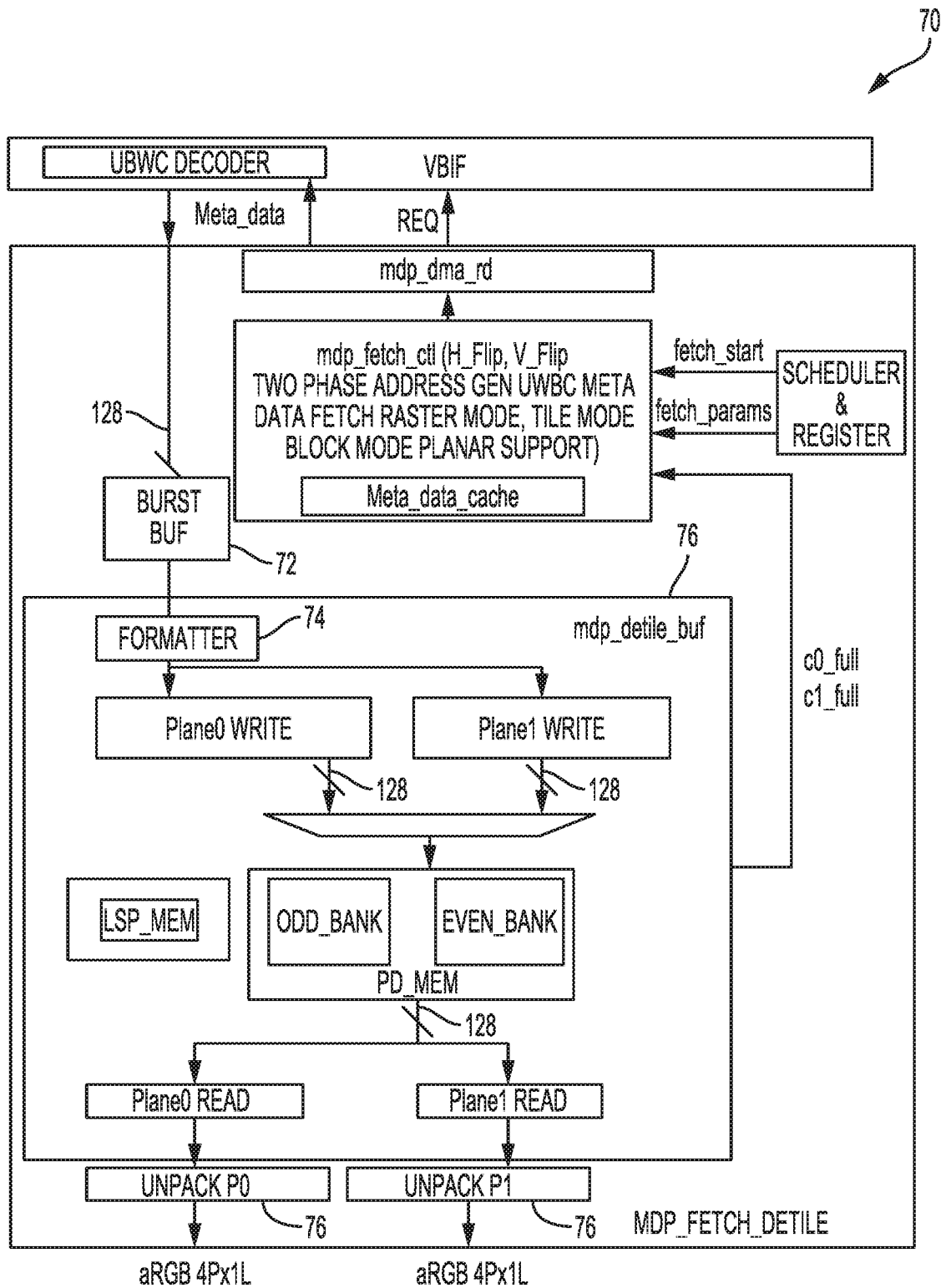
FIG. 6 is a diagram illustrating an example of an address generator included within each of the image fetchers shown in FIG. 2 that facilitate fetching operations in accordance with various aspects of the techniques described in this disclosure.

FIG. 6 is a diagram illustrating an example of an address generator 70 included within each of image fetchers 24 that facilitate fetching operations in accordance with various aspects of the techniques described in this disclosure. Address generator 70 may support separate horizontal and vertical flip operations for pixels (P0 and P1) from two different ones of independent layers 27. Address generator 70 may perform the horizontal flip operation as a negative x direction walk with respect to both pixel and metadata.

Burst buffer 72 of address generator 70 may support horizontal flip burst alignment on both P0 and P1 plane (which refers to the streams, or planes, of pixels from each of the two different ones of independent layers 27). Formatter 74 may support include separate P0 and P1 interface to the de-tile buffer. De-tile buffer 76 may support burst level horizontal flip operations, while unpacker 76 may handle horizontal flip operators within each access unit (which may refer to 16-bytes of pixel data). The video pipeline for image fetchers 24, while not explicitly shown in FIG. 6, may also include an address generator similar to that of address generator 70 that may be adapted to support multi-layer fetch and the other aspects described above.

Figure 7:
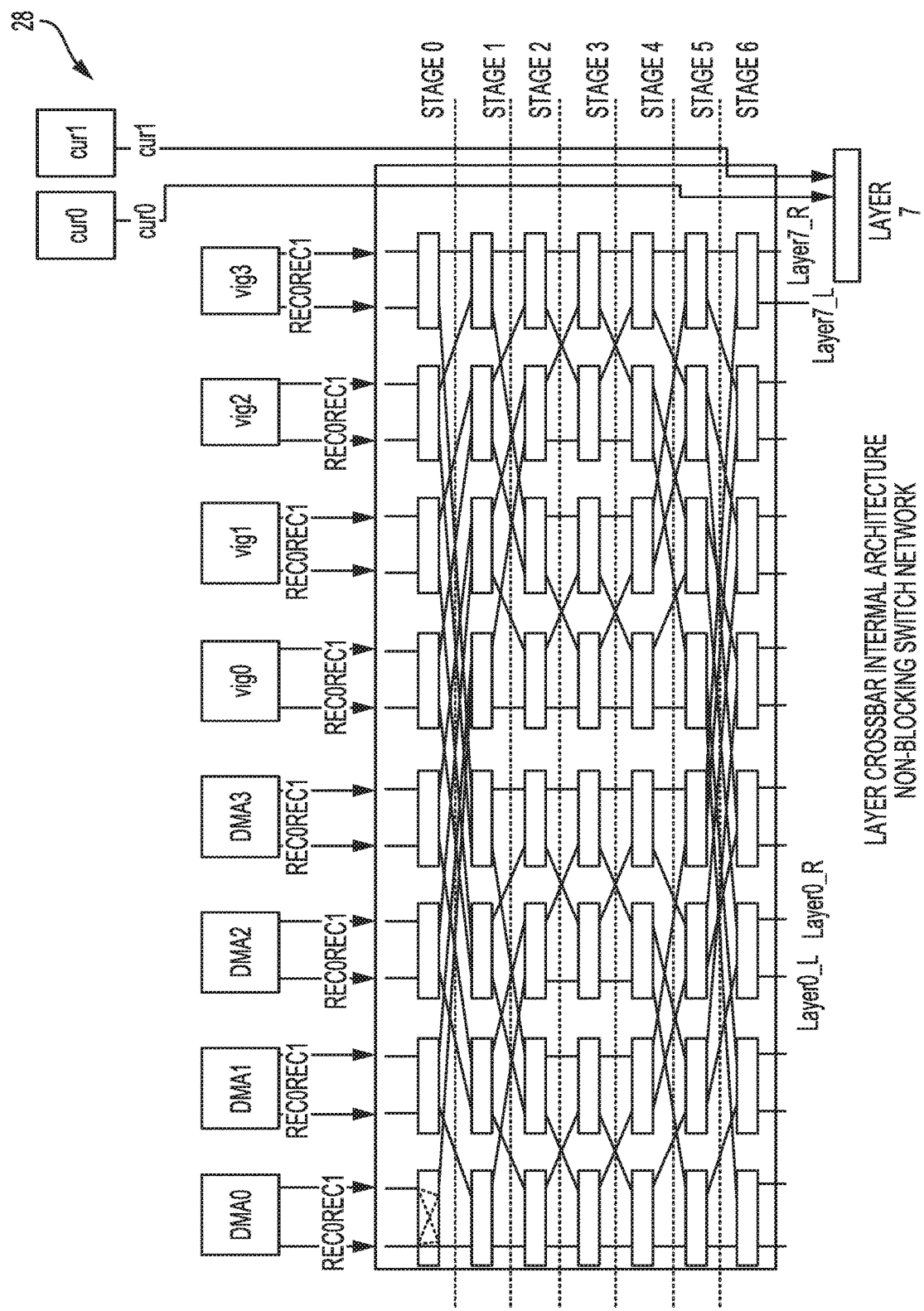
FIG. 7 is a diagram illustrating an example of the crossbar of FIG. 2 in more detail.

FIG. 7 is a diagram illustrating an example of crossbar 28 of FIG. 2 in more detail. As noted above, crossbar 28 may support multi-layers on all source pipes. In the example of FIG. 7, there are a total of 8 source pipes and 16 layers. All layers (which may refer to rectangles as noted above) may support source screen split, which may result in, for 16 input rectangles, 16 outputs at crossbar 28 (8 layers times 2 to account for left and right half on each layer). Instead of having two crossbars per mixer 30 with each crossbar configured to handle 16 input and 8 output, crossbar 28 may be configured as a single 16×16 crossbar that handles 16 input and 16 output.

The internal architecture of crossbar 28 shown in the example of FIG. 7 may, instead of implementing a full 16×16 crossbar, be decomposed into sub 2×2 crossbars. The routings between different sub crossbars may be fixed. The internal routing of the 2×2 crossbar may be done at every frame start. The routing may be configured using the information of each source layer number associate with each source pipe, and after the routing phase, the 2×2 crossbar are fully configured. The routing can be done one clock per level (or, in other words, stage). The entire crossbar configuration can be done within 8 clock cycles (configure mode). After configuration is done, the crossbar links the source pipe (e.g., image fetchers 24) to mixer 30, and crossbar 28 may enter into a transfer mode (data mode).

Crossbar 28, as shown in FIG. 7, may reduce a number of multiplexors (which may refer to the nodes—white boxes— of each stage) by up to 50% compared to a simple 16×16 crossbar design by using the non-blocking switching architecture. The following pseudocode describes an example configuration for crossbar 28.

```
//Pseudo code for crossbar configuration
//create the fixed network,
//7 levels (y direction), each level has 8 (x direction) 2x2 mini-crossbar, each bar has
two connections to the level up and 2 connections to the level down total 16 connections
up and 16 connection down, the fixed network has a double link data structure
LV[y][x].dn[3:0]; //down connection for current level ,y=0 to 6, x =0 to 15
LV[y][x].up[3:0]; // up connection for current level
LV[y][x].ilayer[3:0]; //layer mixer layer number. 16 unique layers (8 layers ×2
sublayers) need flops for these signals. Total flops are 7*16*4=448
LV[y][x]. iactive //current layer is used in current frame. Not used layer has this value
set to 0. Need flops for these signals. Total flops are 7×16=112
LV[y][x].olayer[3:0], //layer mixer layer number at each level output
LV[y][x]. oactive //current layer active bit at the output of each level
// fixed connection between level 0 to level 1 and level 6 to level 5. They have the same
connection to the next level
For (k=0,k<8, k++){
LV[0][2*k].dn=k; LV[0][2*k+1].dn=8+k;
LV[6][2*k].up=k; LV[6][2*k+1].up=8+k}
//fixed connection between level 1 to level 2 and level 5 to level 4. They have the same
connection to the next level
For (m=0, m<2, m++){For (k=0, k<4, k++){
LV[1][m*8+2*k].dn=m*8+k;LV[1][m*8+2*k+1].dn=m*8+4+k
LV[5][m*8+2*k].up=m*8+k;LV[5][m*8+2*k+1].up=m*8+4+k}
//fixed connection between level 2 to level 3 and level 4 to level 3. They have the same
connection to the next level
For (n=0, n<2, n++){For (m=0,m<2,m++){For (k=0,k<2,k++){
LV[2][n*8+m*4+2*k].dn=n*8+m*4+k;LV[2][n*8+m*4+2*k+1].dn=n*8+m*4+2+k
LV[4][n*8+m*4+2*k].up=n*8+m*4+k;LV[4][n*8+m*4+2*k+1.up]=n*8+m*4+2+k}}}
// close the double link
For (y=1,y<4,y++){ For (x=0, x<16, x++){
LV[y][LV[y−1][x].dn].up=LV[y−1][x].dn
LV[6−y][LV[7−y][x].up].dn=LV[7−y][x].up}
//Config network at start of the frame to form 16x16 crossbar
//LV_CFG[y][x].cross[0] is the 2x2 mini-bar crossover select signals. 7 levels (y
direction) and each level has 8 (x direction) mini 2x2 bar. Each mini bar needs one bit to
determine 0= no crossover, 1=crossover. Total 7 level x 8 bit configuration need to be
setup during frame start up. Configuration is 1 level at a time from both top and bottom
level. Total cycle is 4 (meet in the middle) to completely setup crossbar network.
LV_CFG[y][x].cross[0] =0 //y=0, to 6, x =0 to 7. default to 0(no cross)
***************************
// level 0 cross config in clock 0
***************************
N=0
```

-continued

```
For (j=0,j<7,j++){For (k=j,k<7,k++){// find the conflict, Left half and right half check
independently.
CMP[N].L_l=LV[0][2*j].ilayer[3:1];CMP[N].L_l_a= LV[0][2*j].iactive;
CMP[N].L_r=LV[0][(2*(k+1)].ilayer[3:1];CMP[N].L_r_a=LV[0][2*(k+1)].iactive;
CMP[N].R_l=LV[0][2*j+1].ilayer[3:1];CMP[N].R_l_a= LV[0][2*j+1].iactive;
CMP[N].R_r=LV[0][(2*(k+1)+1].ilayer[3:1];CMP[N].R_r_a=LV[0][2*(k+1)+1].iactive
;
// cross over when adjacent active layer number are on the same left or right half
If ((CMP[N].L_l==CMP[N].L_r) && CMP[N].L_l_a&& CMP[N],L_r_a))
   ||(CMP[N].R_l==CMP[N].R_r) && CMP[N].R_l_a&& CMP[N].R_r_a))
{LV_CFG[0][j].cross=1}
N=N+1
}
For (i=0,i<16, i++){
// trafer the layer number to the next level after level 0 crosses are set
LV[1][i].ilayer=LV[0][(LV[1][i].up[3:1]<<1 + LV_CFG[0][LV[1][i].up>1].cross
^LV[1][i].up[0]].ilayer
LV[1][i].iactive=LV[0][(LV[1][i].up[3:1]<<1 + LV_CFG[0][LV[1][i].up>1].cross
^LV[1][i].up[0]].iactive}
// level 6 cross config is a slave of level 0 config
For (s=0, s<2, s++){For (i=0, i<8, i++){//if odd layer end in the left half of the bar in
level 1, it need cross at the level 6. If even layer end in the right half of the bar need
cross at level 6 as well.
If ((LV[1][8*s+i].ilayer[0]~=s) && (LV[1][8*s+i].iative==1)
LV_CFG[6][LV[1][8*s+i].ilayer[3:1]].cross=1}}
// transfer layer number to layer 5 after level 6 cross is set
For (i=0,i<16, i++){
LV[5][i].olayer=LV[6][LV[5][i].dn[3:1]<<1+LV_CFG[6][LV[5][i].dn[3:1].cross^LV[5][
i].dn[0]].olayer
LV[5][i].oactive=LV[6][LV[5][i].dn[3:1]<<1+LV_CFG[6][LV[5][i].dn[3:1].cross^LV[5]
[i].dn[0]].oactive
}
********************************************************
// level 1 cross config in clock 1 reuse the comparator used in L0 config
********************************************************
N=0
For (j=0,j<4,j++){for (k=j,j<4,k++){for (s=0,s<2, s++){ //s=0 left 8x8 bar, s=1 right 8x8
bar
CMP[N+s].L_l=LV[1][8*s+2*j].ilayer[3:1];CMP[N].L_l_a= LV[1][8*s+2*j].iactive;
CMP[N+s].L_r=LV[1][(8*s+2*(k+1)].ilayer[3:1];CMP[N].L_r_a= LV[1][8*s+2*(k+1)].
iactive;
CMP[N+s].R_l=LV[1][8*s+2*j+1].ilayer[3:1];CMP[N].R_l_a=
LV[1][8*s+2*j+1].iactive;
CMP[N+s].R_r=LV[1][(8*s+2*(k+1)+1].ilayer[3:1];CMP[N].R_r_a=LV[1][8*s+2*(k+
1)+1].iactive;
// cross over when adjacent layer number are on the same left or right half of the 8x8 bar
(eq to 8x8 crossbar level 0 cross logic)
If ((CMP[N+s].L_l==CMP[N+s].L_r) && CMP[N+s].L_l_a&& CMP[N+s],L_r_a))
   ||(CMP[N+s].R_l==CMP[N+s].R_r) && CMP[N+s].R_l_a&& CMP[N+s].R_r_a))
{LV_CFG[1][4*s+j].cross=1}
N=N+2}}}
For (i=0,i<15, i++){// trafer the layer number to the next level after level 1 crosses are
set
LV[2][i].ilayer=LV[1][(LV[2][i].up[3:1] + LV_CFG[1][LV[2][i].up>1].cross
^LV[0][i].up[0]].ilayer}
}
// level 5 cross config is a slave of level 1 config
For (s=0, s<2, s++){For (i=0, i<4, i++){for(j=i,j<4,j++)
If ((LV[5][8*s+2i].olayer== LV[2][8*s+4+j].ilayer) && (LV[2][8*s+4+j].iative &&
LV[5][8*s+2i].oactive || LV[5][8*s+2i+1].olayer== LV[2][8*s+j].ilayer) &&
(LV[2][8*s+4+j].iative && LV[5][8*s+2i+1].oactive)
LV[5]_CFG[4*s+i]].cross=1}}
// transfer level 5 layer number to layer 4
For (i=0, i<16,i++){
LV_[4][i].olayer=LV[5][LV[4][i].dn[3:1]<<1+LV[4][i].dn[0]^LV_CFG[5][LV[4][i].dn[
3:1]].cross].olayer
LV_[4][i].oactive=LV[5][LV[4][i].dn[3:1]<<1+LV[4][i].dn[0]^LV_CFG[5][LV[4][i].dn[
3:1]].cross].oactive
}
********************************************************
// level 2 cross config in clock 2 reuse the comparator used in L0 config
********************************************************
N=0
For (j=0,j<2,j++){for (k=j,k<2,k++){for (s=0,s<4, s++){ //s=0 left most 4x4 bar, s=3
right most 4x4 bar
CMP[N+s].L_l=LV[2][4*s+2*j].ilayer[3:1];CMP[N].L_l_a= LV[2][4*s+2*j].iactive;
CMP[N+s].L_r=LV[2][(4*s+2*(k+1)].ilayer[3:1];CMP[N].L_r_a=LV[2][4*s+2*(k+1)].
iactive;
```

```
CMP[N+s].R_l=LV[2][4*s+2*j+1].ilayer[3:1];CMP[N].R_l_a=
LV[2][4*s+2*j+1].iactive;
CMP[N+s].R_r=LV[2][(4*s+2*(k+1)+1].ilayer[3:1];CMP[N].R_r_a=LV[2][4*s+2*(k+
1)+1].iactive;
// cross over when adjacent layer number are on the same left or right half of the 4x4 bar
(eq to 4x4 crossbar level 0 cross logic)
If ((CMP[N+s].L_l==CMP[N+s].L_r) && CMP[N+s].L_l_a&& CMP[N+s],L_r_a))
  ||(CMP[N+s].R_l==CMP[N+s].R_r) && CMP[N+s].R_l_a&& CMP[N+s].R_r_a))
{LV_CFG[2][2*s+j].cross=1}
// level 2 cross config in clock 2 reuse the comparator used in L0 config
N=N+8}}}
For (i=0,i<16, i++){
// trafer the layer number to the next level(3) after level 2 crosses are set
LV[3][i].ilayer=LV[2][(LV[3][i].up[3:1] + LV_CFG[2][LV[3][i].up>1].cross
^LV[0][i].up[0]].ilayer}
LV[3][i].iactive=LV[2][(LV[3][i].up[3:1] + LV_CFG[2][LV[3][i].up>1].cross
^LV[0][i].up[0]].iactive}
}
//L4 config is a slave of L2 config
For (s=0, s<2, s++){For(ss=0,ss<2, ss++){ For (i=0, i<2, i++)
If ((LV[4][8*s+4*ss+2i].olayer== LV[3][8*s+4+j].ilayer) &&
(LV[3][8*s+4*ss+2+i].iative && LV[4][8*s+4*ss+2i].oactive ||
LV[4][8*s+4*ss+2i+1].olayer== LV[3][8*s+4*ss+i].ilayer) &&
(LV[2][8*s+4*ss+i].iative && LV[5][8*s+4*ss+2i+1].oactive)
LV[4]_CFG[4*s+2*ss+i]].cross=1}}
// transfer layer number from level 4 to level 3
For (i=0, i<16,i++){
LV_[3][i].olayer=LV[4][LV[3][i].dn[3:1]<<1+LV_[3][i].dn[0]^LV_CFG[4][LV[3][i].dn[
3:1]].cross].olayer
LV_[3][i].oactive=LV[4][LV[3][i].dn[3:1]<<1+LV[3][i].dn[0]^LV_CFG[4][LV[3][i].dn[
3:1]].cross].oactive}
***********************************
*//level 3 cross config. clock cycle 3
***********************************
For (i=0,i< 8, i++){
If ((LV[3][2*i].ilayer !=LV[3][2*i].olayer )|| LV[3][2*i+1].ilayer!=LV[3][
2*i+1].olayer)){LV_CFG[3][i].cross=1}}
```

Figure 8C:
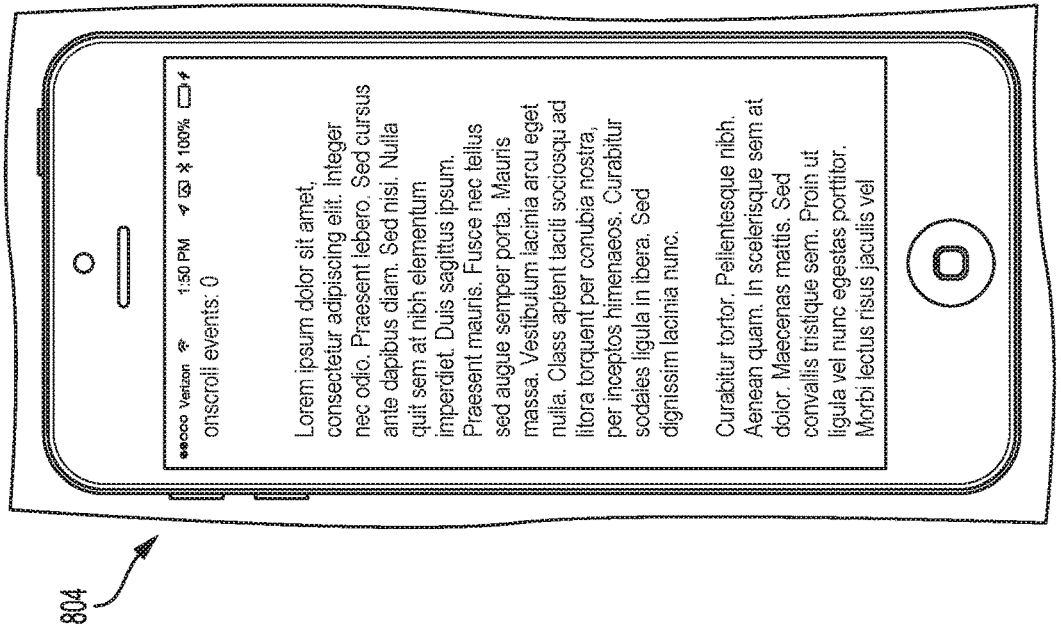
FIGS. 8A-8C illustrate example smartphone screen shots displaying content suitable for scrolling.
Figure 8A:
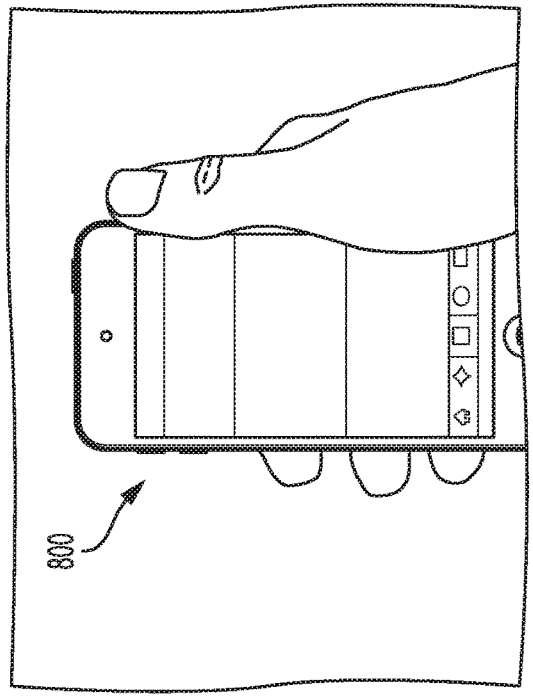
Figure 8B:
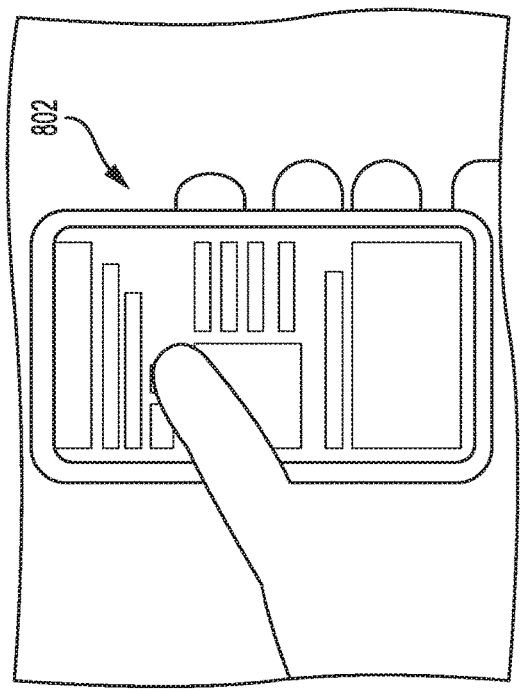

FIGS. 8A-8C illustrate example smartphone screen shots displaying content suitable for scrolling. FIG. 8A illustrates an example screen shot 800 displaying a video. FIG. 8B illustrates an example screen shot 802 displaying a mix of images and text. FIG. 8C illustrates an example screen shot 804 displaying text. It will be appreciated that the illustrated displays may be scrolled in various directions, for example, up and down. The displayed content may be scrolled responsive to user input, for example, a finger swipe in the direction of user desired scrolling. The scrolling may occur at different speeds, for example, responsive to a magnitude of the user's finger swipe. As discussed herein, high speed scrolling may require a high frame rate so the scrolling does not appear choppy/jerky to a user or otherwise impact user experience.

Alternative user inputs may determine a scroll speed and direction. For example, a user voice command, a user eye gaze command, and a user-initiated autoscroll command may also be used to determine the scroll speed.

Figure 9:
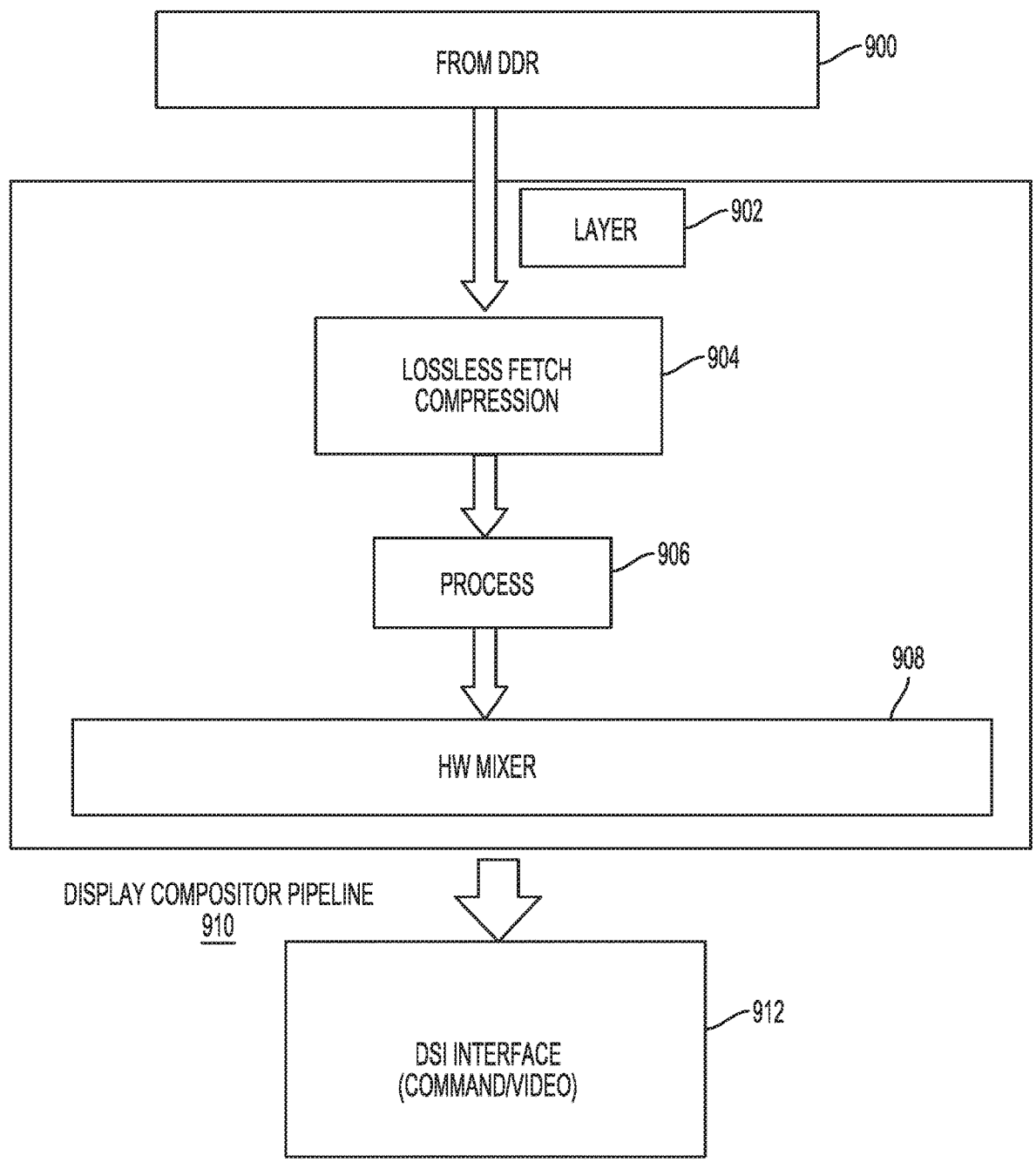
FIG. 9 is a flowchart illustrating one approach to supporting scrolling content.

FIG. 9 is a flowchart illustrating one approach to supporting scrolling content. A device as discussed may include a rendering pipeline as illustrated. A random-access memory 900 may be, for example, a Double Data Rate Synchronous Dynamic Random-Access Memory (DDR SDRAM) or another type of memory. The memory 900 may store a layer 902 for display. For example, the layer 902 may be rendered by a GPU responsive to instructions from an application executing on a processor and stored in the memory 900.

In this approach, the layer 902 is retrieved from memory 900 with lossless fetch compression in 904. Lossless compression ensures no information from the layer is lost during the retrieval, but incurs memory bandwidth and power consumption costs of retrieving a large amount of information from the memory 900. The rendering and displaying process to support scrolling content, as discussed herein, may require multiple accesses to the memory 900. For example, high frame rate rendering and display to support high speed or fast scrolling may require many layer retrievals from memory. This creates latency or delay, requires memory bandwidth, and consumes power.

Once the layer 902 is retrieved, it may be additionally processed in 906. 906 may execute source processing of an image layer. Example processes may include, for example, Color space conversion (for example, YUV to RGB), Scaling (for example, changing resolution of image—upscaling/downscaling), Image Cropping (for example, Configuring ROI and stride), Decimation, and De-interleaving image.

A hardware mixer 908 may receive the output from process 906 and mix in any other necessary signals or components. A resulting output is sent to the display compositor pipeline 910, which communicates with an DSI interface 912. The DSI interface provides a standardized interface with display panels.

For example, the DSI interface may conform to the Display Serial Interface (DSI) specification by the Mobile Industry Processor Interface (MIPI) Alliance defining display controllers in mobile devices. It may support LCD and similar display technologies. It may define a serial bus and a communication protocol between a host (source of the image data) and a display device such as a display panel. For example, display panels may be either command mode or video mode. The desired image content is then displayed on the display.

Figure 10:
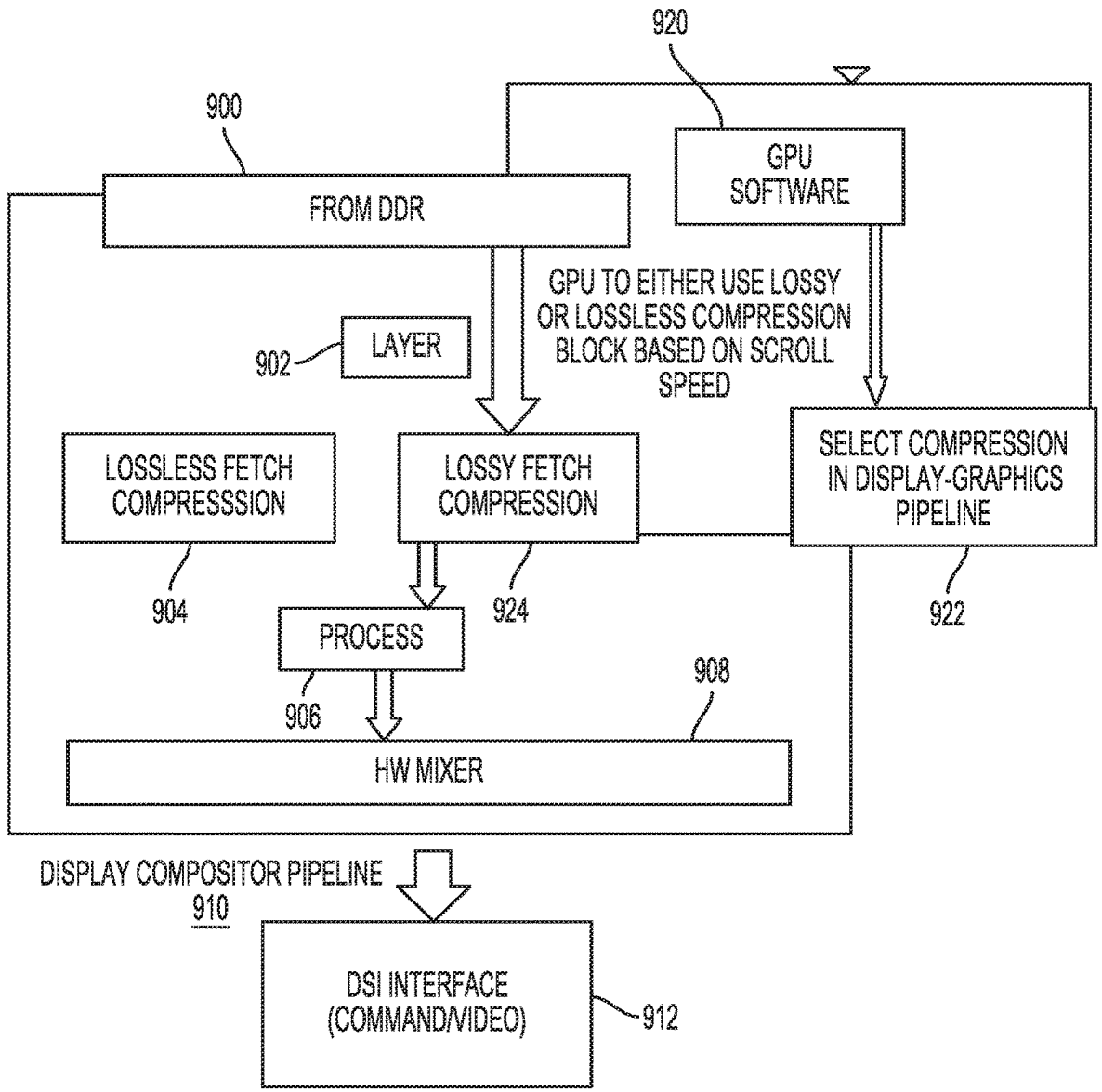
FIG. 10 is a flowchart illustrating an improved approach to supporting scrolling content.

FIG. 10 is a flowchart illustrating an improved approach to supporting scrolling content. High resolution displays support high resolution frames required by applications, rendered by GPUs or other processors. As discussed, various user applications support scrolling of displayed content. During scrolling, frames are rendered at a high frame rate to support user experience. In such cases, the content changes frequently and may not be not clearly visually perceived by the user. During high speed scrolling on high resolution displays, GPU and display processor may consume large amounts of power and memory bandwidth to handle high frame rate content.

During low speed scrolling, the layer 902 may be retrieved from memory 900 with lossless fetch compression 904 for communication over the DSI interface 912 as discussed above.

During high speed scrolling, content is rendered and displayed at a fast rate (high frames per second), thus individual frames of the content are less visually perceivable to the user. A GPU software 920 may determine such conditions are suitable to utilize lossy fetch compression 924 instead of lossless fetch compression 904. For example, a first threshold scroll speed may be set by software, user preferences, or system default, below which lossless fetch compression will be used. In this example, lossy fetch compression will be used if the requested scroll speed is above the first threshold scroll speed.

A specific compression scheme may be selected in display-graphics pipeline 922. As discussed here, a compression factor may be varied depending on a desired quality to compression ratio: a higher compression factor may result in a lower quality output of the layer. Alternatively, a lower compression factor may result in a higher quality output of the layer. For example, a second threshold scroll speed may be set by software, user preferences, or system default. If the requested scroll speed is above the second threshold scroll speed, a higher compression factor lossy fetch compression may be used.

Utilizing lossy fetch compression 924 when retrieving layer 902 from memory 900 can reduce required memory bandwidth and power consumption during scrolling use cases. While the quality of individual frames and the layer overall may suffer, such decreased quality is unlikely to impact the user experience as the frames are changing very quickly. Furthermore, a compression factor or compression ratio can be further increased as the scroll speed and rendering frame rate increases, further increasing savings with minimal impact to user experience. In other embodiments, a fixed amount of memory bandwidth may be allocated, and the compression factor is selected to ensure the allocated memory bandwidth is not exceeded. In other embodiments, a fixed amount of power may be allocated for the rendering process, and the compression factor is selected to ensure the allocated power is not exceeded.

The power consumption of display processor during the layer fetch from DDR memory is proportional to: 1. Width and height of layer, 2. bits per pixel of the layer, and 3. Frame rate (often measured in frames-per-second or FPS). The power consumption is inversely proportional to any applied fetch compression factor, which reduces a size of the layer actually retrieved from memory. Bandwidth consumption, and thus, power consumption, can be reduced by increasing fetch compression.

As an example, if a compression factor is 4, an estimated 15% power savings can be achieved.

TABLE 1

| Estimated power savings | | | | |
|---|---|---|---|---|
| Video playback | Existing (mA) | With proposed changes (mA) | Savings (mA) | Percentage Savings |
| WQHD RGB layer | 325.52 mA | ~274.07 mA | ~50 | 15% |

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of displaying scrolling content, the method comprising:
    responsive to instructions from an executing application, rendering a layer by a Graphical Processing Unit (GPU) into a memory;
    determining a requested scrolling speed based on a user input;
    determining a desired frame rate based on the user input;
    communicating the requested scrolling speed and desired frame rate to the GPU, wherein the layer is rendered by the GPU into the memory, at least in part, based on the requested scrolling speed and desired frame rate;
    retrieving the rendered layer from the memory, wherein the rendered layer is retrieved from the memory with lossless fetch compression in response to determining that the requested scrolling speed is at or below a first threshold and that the requested scrolling speed is above zero, and wherein the rendered layer is alternatively retrieved from the memory with lossy fetch compression in response to determining that the requested scrolling speed is above the first threshold; and
    communicating the retrieved rendered layer to a display panel at the desired frame rate, wherein the display panel includes a display hardware compositor configured to,
        responsive to determining the rendered layer was retrieved from the memory using the lossless fetch compression, decompressing the received retrieved renderer layer with lossless decompression for display, and
        responsive to determining the rendered layer was retrieved from the memory using the lossy fetch compression, decompressing the received retrieved renderer layer with lossy decompression for display.

2. The method of claim 1, wherein the user input is based on at least one of: a magnitude of a touch panel user finger swipe, a direction of the touch panel user finger swipe, a user voice command, a user eye gaze command, and a user-initiated autoscroll command.

3. The method of claim 1, further comprising:
    responsive to determining the requested scrolling speed is at or above a second threshold, wherein the second threshold is higher than the first threshold, increasing a compression factor of the lossy fetch compression.

4. The method of claim 3, wherein the lossy fetch compression is executed by the GPU on the rendered layer in the memory.

5. The method of claim 3, wherein the compression factor is increased based on at least one of: a memory bandwidth limit and a memory fetch power consumption limit.

6. The method of claim 1, wherein the retrieved rendered layer is communicated to the display panel over a display compositor pipeline and a Display Serial Interface (DSI) interface.

7. The method of claim 6, wherein the DSI interface is in communication with at least one of: a command mode display panel and a video mode display panel.

8. An apparatus for displaying scrolling content, the apparatus comprising:
    a memory; and
    a processor, the processor configured to
        responsive to instructions from an executing application, render a layer by a Graphical Processing Unit (GPU) into the memory,
        determine a requested scrolling speed based on a user input,
        determine a desired frame rate based on the user input,
        communicate the requested scrolling speed and desired frame rate to the GPU, wherein the layer is rendered by the GPU into the memory, at least in part, based on the requested scrolling speed and desired frame rate,
        retrieve the rendered layer from the memory, wherein the rendered layer is retrieved from the memory with lossless fetch compression in response to determining that the requested scrolling speed is at or below a first threshold and that the requested scrolling speed is above zero, and wherein the rendered layer is alternatively retrieved from the memory with lossy fetch compression in response to determining that the requested scrolling speed is above the first threshold; and
        communicate the retrieved layer to a display panel at the desired frame rate, wherein the display panel includes a display hardware compositor configured to,
            responsive to determining the rendered layer was retrieved from the memory using the lossless fetch compression, decompressing the received retrieved renderer layer with lossless decompression for display, and
            responsive to determining the rendered layer was retrieved from the memory using the lossy fetch compression, decompressing the received retrieved renderer layer with lossy decompression for display.

9. The apparatus of claim 8, wherein the user input is based on at least one of: a magnitude of a touch panel user finger swipe, a direction of the touch panel user finger swipe, a user voice command, a user eye gaze command, and a user-initiated autoscroll command.

10. The apparatus of claim 8, wherein the processor is further configured to
    responsive to determining the requested scrolling speed is at or above a second threshold, wherein the second threshold is higher than the first threshold, increase a compression factor of the lossy fetch compression.

11. The apparatus of claim 10, wherein the lossy fetch compression is executed by the GPU on the rendered layer in the memory.

12. The apparatus of claim 10, wherein the compression factor is increased based on at least one of: a memory bandwidth limit and a memory fetch power consumption limit.

13. The apparatus of claim 8, wherein the retrieved rendered layer is communicated to the display panel over a display compositor pipeline and a Display Serial Interface (DSI).

14. The apparatus of claim 13, wherein the DSI interface is in communication with at least one of: a command mode display panel and a video mode display panel.

15. An apparatus for displaying scrolling content, the apparatus comprising:
    means for storage; and
    means for processing, wherein the means for processing configured to
        responsive to instructions from an executing application, render a layer by a Graphical Processing Unit (GPU) into the storage means,
        determine a requested scrolling speed based on a user input,
        determine a desired frame rate based on the user input,
        communicate the requested scrolling speed and desired frame rate to the GPU, wherein the layer is rendered by the GPU into the storage means, at least in part, based on the requested scrolling speed and desired frame rate,
        retrieve the rendered layer from the storage means, wherein the rendered layer is retrieved from the storage means with lossless fetch compression in response to determining that the requested scrolling speed is at or below a first threshold and that the requested scrolling speed is above zero, and wherein the rendered layer is alternatively retrieved from the storage means with lossy fetch compression in response to determining that the requested scrolling speed is above the first threshold; and
        communicating the retrieved layer to a display panel at the desired frame rate, wherein the display panel includes a display hardware compositor configured to,
        responsive to determining the rendered layer was retrieved from the storage means using the lossless fetch compression, decompressing the received retrieved renderer layer with lossless decompression for display, and
        responsive to determining the rendered layer was retrieved from the storage means using the lossy fetch compression, decompressing the received retrieved renderer layer with lossy decompression for display.

16. The apparatus of claim 15, wherein the user input is based on at least one of: a magnitude of a touch panel user finger swipe, a direction of the touch panel user finger swipe, a user voice command, a user eye gaze command, and a user-initiated autoscroll command.

17. The apparatus of claim 15, wherein the means for processing is further configured to,
    responsive to determining the requested scrolling speed is at or above a second threshold, wherein the second threshold is higher than the first threshold, increase a compression factor of the lossy fetch compression.

18. The apparatus of claim 17, wherein the lossy fetch compression is executed by the GPU on the rendered layer in the storage means.

19. The apparatus of claim 17, wherein the compression factor is increased based on at least one of: a memory bandwidth limit and a memory fetch power consumption limit.

20. The apparatus of claim 15, wherein the retrieved rendered layer is communicated to the display panel over a display compositor pipeline and a Display Serial Interface (DSI).

21. The apparatus of claim 20, wherein the DSI interface is in communication with at least one of: a command mode display panel and a video mode display panel.

22. A non-transitory computer-readable storage medium having stored thereon instructions that, when executed, cause a processor to
    responsive to instructions from an executing application, render a layer by a Graphical Processing Unit (GPU) into a memory;
    determining a requested scrolling speed based on a user input;
    determining a desired frame rate based on the user input;
    communicating the requested scrolling speed and desired frame rate to the GPU, wherein the layer is rendered by the GPU into the memory, at least in part, based on the requested scrolling speed and desired frame rate;
    retrieving the rendered layer from the memory, wherein the rendered layer is retrieved from the memory with lossless fetch compression in response to determining that the requested scrolling speed is at or below a first threshold and that the requested scrolling speed is above zero, and wherein the rendered layer is alternatively retrieved from the memory with lossy fetch compression in response to determining that the requested scrolling speed is above the first threshold; and
    communicate the retrieved layer to a display panel at the desired frame rate, wherein the display panel includes a display hardware compositor configured to,
    responsive to determining the rendered layer was retrieved from the memory using the lossless fetch compression, decompressing the received retrieved renderer layer with lossless decompression for display, and
    responsive to determining the rendered layer was retrieved from the memory using the lossy fetch compression, decompressing the received retrieved renderer layer with lossy decompression for display.

23. The non-transitory computer-readable storage medium of claim 22, wherein the user input is based on at least one of: a magnitude of a touch panel user finger swipe, a direction of the touch panel user finger swipe, a user voice command, a user eye gaze command, and a user-initiated autoscroll command.

24. The non-transitory computer-readable storage medium of claim 22, the processor further configured to
    responsive to determining the requested scrolling speed is at or above a second threshold, wherein the second threshold is higher than the first threshold, increase a compression factor of the lossy fetch compression.

25. The non-transitory computer-readable storage medium of claim 24, wherein the lossy fetch compression is executed by the GPU on the rendered layer in the memory and the compression factor is increased based on at least one of: a memory bandwidth limit and a memory fetch power consumption limit.

26. The non-transitory computer-readable storage medium of claim 22, wherein the retrieved rendered layer is communicated to the display panel over a display compositor pipeline and a Display Serial Interface (DSI) and the DSI interface is in communication with at least one of: a command mode display panel and a video mode display panel.

* * * * *